United States Patent
Ishimura et al.

(10) Patent No.: US 6,424,615 B1
(45) Date of Patent: *Jul. 23, 2002

(54) OPTICAL DISK HAVING PLURALITY OF VOLUMES, RECORDING DEVICE AND REPRODUCTION DEVICE FOR SAME

(75) Inventors: Yutaka Ishimura; Morihiro Murata; Kenichiro Takeshita, all of Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,802

(22) Filed: Dec. 21, 1998

(30) Foreign Application Priority Data

| Dec. 24, 1997 | (JP) | ................................. 9-366516 |
| Jan. 29, 1998 | (JP) | ............................ 10-032063 |
| Jan. 29, 1998 | (JP) | ............................ 10-032064 |

(51) Int. Cl.⁷ .............................. G11B 7/24; G11B 7/00
(52) U.S. Cl. ................................ 369/275.3; 369/59.25; 369/53.41
(58) Field of Search ........................... 369/275.3, 275.1, 369/32, 58, 54, 48, 59, 47, 30, 33, 53.41, 53.44, 47.54, 59.25, 30.03

(56) References Cited

U.S. PATENT DOCUMENTS

| 5,341,356 A | * | 8/1994 | Dieleman et al. ............. 369/47 |
| 5,537,387 A | * | 7/1996 | Ando et al. ............... 369/275.1 |
| 5,617,384 A | * | 4/1997 | Yonemitsu et al. ........... 369/32 |
| 5,684,786 A | * | 11/1997 | Schylander et al. ...... 369/275.3 |
| 5,732,088 A |   | 3/1998 | Sako .................... 369/275.3 X |
| 5,734,787 A | * | 3/1998 | Yonemitsu et al. ......... 386/111 |
| 5,825,726 A | * | 10/1998 | Hwang et al. ................. 369/32 |
| 5,878,019 A | * | 3/1999 | Schylander et al. ...... 369/275.3 |
| 6,072,759 A | * | 6/2000 | Maeda et al. ............ 369/59.25 |
| 6,243,343 B1 | * | 6/2001 | Ishimura et al. .......... 369/53.41 |

FOREIGN PATENT DOCUMENTS

JP       5-258469      10/1993

* cited by examiner

Primary Examiner—Ali Neyzari
(74) Attorney, Agent, or Firm—Pillsbury Winthrop LLP

(57) ABSTRACT

An optical disk has a recording surface which is divided in the radial direction of the optical disk into a plurality of volumes. Each volume consists of a lead-in area, a program area and a lead-out area. Each of the volumes has a recording capacity which is not constant and has absolute position information recorded therein. The absolute position information consists of time information starting from a common initial value. The lead-in area, program area and lead-out area of the respective volumes is adapted to have information of the Compact Disc format recorded therein and adapted to have volume number information corresponding to the volume number thereof recorded in a predetermined position of the area. In one aspect of the invention, a part or all of the volumes has a higher recording density than a standard recording density determined by the Compact Disc format and absolute address information continuously increments from an initial value without overlapping among the respective volumes and address information is independent from the absolute address information. In another aspect of the invention, address information and absolute address information recorded in the first volume are within a range determined by the Compact Disc format and address information and absolute address information recorded in the second and subsequent volumes are larger than a value determined by the Compact Disc format.

36 Claims, 15 Drawing Sheets

| SYNC (2) | CNT (4) | ADD (4) | TNO (8) | POINT (8) | TIME | | | ZERO (8) | PTIME | | | CRC (16) |
|---|---|---|---|---|---|---|---|---|---|---|---|---|
| | | | | | MIN (8) | SEC (8) | FRAME (8) | | PMIN (8) | PSEC (8) | PFRAME (8) | |

FIG. 2

| SYNC (2) | CNT (4) | ADD (4) | TNO (8) | INDEX (8) | TIME | | | ZERO (8) | ATIME | | | CRC (16) |
|---|---|---|---|---|---|---|---|---|---|---|---|---|
| | | | | | MIN (8) | SEC (8) | FRAME (8) | | AMIN (8) | ASEC (8) | AFRAME (8) | |

FIG. 3

OPTICAL DISK HAVING PLURALITY OF VOLUMES, RECORDING DEVICE AND REPRODUCTION DEVICE FOR SAME

BACKGROUND OF THE INVENTION

This invention relates to an optical disk capable of recording information according to the CD format with a greater recording capacity than the currently available 12 cm CD (Compact Disc), an optical disk recording device for recording information on this optical disk and an optical disk reproduction device for reproducing information from this optical disk.

Recording and reproducing time of the currently available CD is about 74 minutes at the maximum. Recording of a longer time can be made by increasing recording density or enlarging the diameter of the CD. Since, however, time information which can be expressed according to the subcode of the CD format is 99 minutes 59 seconds 74 frames at the maximum, some arrangement must be made if one wishes to record information of 100 minutes or more.

For example, Japanese Patent Application Laid-open No. Hei 7-262696 discloses an optical disk in which the recording surface area or portion of a single disk is divided in the radial direction into a plurality of areas each having a constant recording capacity, each divided area is constituted of a lead-in area, a program area and a lead-out area, and, in PSEC, PFRAME or ZERO of Q-channel subcodes in the first lead-in area or in an identification information area which is provided inside of the first lead-in area, identification information for identifying recording states of various information such as the number of the divided areas, number of combined areas, recording capacity of each divided area and TOC of each divided area is recorded. Absolute time information recorded in each divided area starts from a common initial value. A search operation for searching a particular position in a particular divided area is performed on the basis of detection of a position of an optical pickup in the radial direction of the disk (search in the divided area) and detection of absolute time information read from the disk (search in the divided area).

According to the device of the above described publication, since the recording capacity of each divided area is constant, in a case where recording of one program information is finished before the end of the divided area when a plurality of program information are to be recorded in the respective divided areas, there occurs a blank portion in the divided area where no effective information is recorded before a start position of a next divided area (i.e., recording start position for next program information) with the result that the recording capacity of the disk is not fully utilized.

Further, in a case where each divided area has a small recording capacity, identification of each divided area becomes difficult because of poor accuracy in detecting the position of the optical pickup in the radial direction with the result that, during a search operation, a divided area which is different from a designated divided area is erroneously searched. Again, when the optical pickup has erroneously entered an adjacent divided area due to skipping caused by a shock from outside, there is likelihood that such erroneous entering of the optical pickup is not detected and reproduction is continued from that position.

It is, therefore, a first object of the invention to enable full utilization of recording capacity in an optical disk in which the recording surface is divided into a plurality of areas and information is recorded in these divided areas by using absolute time information repeatedly, enable accurate searching of a designated divided area and enable returning of an optical pickup to a correct reproduction position when skipping of the optical pickup has occurred, and also to provide an optical disk recording device for recording information on such optical disk and also to provide an optical disk reproduction device for reproducing information from such optical disk.

There is another problem in the prior art optical disk. Minutes, seconds and frames of address information of the CD format are recorded in 2 digit BCD code and, accordingly, the maximum value of address information is 99 minute 59 second 74 frame. Therefore, even though a larger amount of information can be physically recorded in a single disk, such limitation in address information imposes a limit to an amount of information which can be recorded in a single disk. It is conceivable to use address information overlappingly among respective volumes but such arrangement will impair the function of address information designating only one address resulting in occurrence of trouble in an access operation (i.e., a wrong divided area is accessed in spite of the fact that a correct address is designated).

It is, therefore, a second object of the invention to provide an optical disk in which a large amount of information can be recorded without impairing the function of address information designating only one address, and also providing a reproduction device for reproducing this optical disk.

In case information such as a game software is recorded in a CD-ROM with a higher recording density than a standard recording density determined by the CD format, there will occur a case where it is desired to prevent reproduction of such game software by a standard CD-ROM player. In the past, there has not been such an optical disk or an optical disk reproduction device which can satisfy such demand.

It is, therefore, a third object of the invention to provide an optical disk in which restriction is imposed on information which can be reproduced by a standard reproduction device of the CD format and only the first volume can be reproduced by such standard reproduction device, and also to provide an optical disk reproduction device capable of reproducing all information contained in such optical disk.

SUMMARY OF THE INVENTION

For achieving the above described first object of the invention, there is provided an optical disk having a recording surface which is divided in the radial direction of the optical disk into a plurality of volumes each comprising a combination of a lead-in area, a program area and a lead-out area, each of these volumes having a recording capacity which is not constant and being adapted to have absolute position information recorded therein, said absolute position information consisting of time information starting from a common initial value, the lead-in area, the program area and the lead-out area of the respective volumes being adapted to have information of CD format recorded therein, and adapted to have volume number information corresponding to the volume number thereof recorded in a predetermined position of said area.

According to the optical disk of the invention, recording capacity of each volume (i.e., divided area) is not constant (i.e., is variable) and, therefore, by suitably setting the recording capacity of a particular volume in accordance with the capacity of a program to be recorded in this volume, waste of recording capacity can be eliminated and the recording capacity of the disk can be fully utilized. Further, by recording volume number information corresponding to respective volumes in a predetermined position of each format in the lead-in area, program area and lead-out area in the respective volumes, what number of volume is currently being reproduced can be accurately identified by reading out the volume number information from the disk during reproduction of the disk and a search operation can be carried out without mistake even when the recording capacity of the volume is relatively small. Furthermore, since the volume number information is recorded in all of the lead-in area, program area and lead-out area, the volume number can be accurately identified even if skipping of the optical pickup takes place and, therefore, the optical pickup can be restored to a position from which the optical pickup has skipped and reproduction of information can be continued from the restored position.

The volume number information may be recorded in, e.g., ZERO field of Q-channel subcodes. The volume number information may start from 0 or 1. When the volume information starts from 0, the volume number information of the first volume is 0 and, by recording this volume number information 0 in ZERO field, this matches the current CD format and, therefore, reproduction of at least the first volume is possible even in a case where reproduction is rejected unless the ZERO field is 0 in a current CD player or CD-ROM player. In a case where the volume number information starts from 0, control is made during search so as to detect a volume position at which volume number information which is of a value obtained by subtracting 1 from the designated volume number is reproduced. It is also possible to record information indicating presence or absence of the second volume in a main channel of, e.g., the program area of the first volume (for example, such information is recorded in block encoded form in the mode 1 or mode 2 form 1 of the CD-ROM format) and obtain this information when the first volume is reproduced and proceed to the second volume.

By starting the volume number from 1 and recording this volume number 1 in, e.g., ZERO field, it can be identified by merely reproducing the first volume during reproduction that a plurality of volumes are recorded in the disk. When the volume number starts from 1, control is made during search so as to detect a volume position at which volume number information coinciding with the designated volume number value is reproduced.

Final volume identification information indicating that a particular volume is final volume may be recorded, instead of the volume number information or in addition to the volume number information, in a predetermined position of at least the lead-in area of the final volume. By reproducing the final volume, it can be identified that this volume is the final volume whereby a waste operation such as to move the optical pickup radially outwardly after the end of reproduction of the final volume can be eliminated.

By restricting the recording capacity of each of said volumes to less than 100 minutes, current CD players and CD-ROM players can reproduce all volumes if performances of the optical pickup and servo circuit are satisfactory.

When a volume having recording capacity of 100 minutes or more is recorded, by expressing the digit of 10 of minute information in the absolute time information in hexadecimal instead of BCD code, time of 100 minutes or more can be expressed.

There is also provided an optical disk recording device for recording information on the above described optical disk according to the invention.

There is also provided an optical disk reproduction device for reproducing information from the above described optical disk comprising a volume number designation section for designating a volume number, an absolute time designation section for designating absolute time in a volume or information corresponding to the absolute time, a position information extracting circuit for extracting the volume number information and the absolute time information from among information read from the optical disk, and a control circuit for controlling a reproduction position of an optical pickup so that the extracted volume number information will become a value which corresponds to the designated volume number and the extracted absolute time information will become a value which corresponds to the designated absolute time.

According to the optical disk reproduction device, a specific track (e.g., music piece) in a specific volume among the plural volumes of the disk can be designated and searched for reproduction.

For achieving the second object of the invention, there is provided an optical disk having a recording surface on which information prepared in accordance with a CD format is recorded and which is divided in the radial direction of the disk into a plurality of volumes each comprising a combination of a lead-in area, a program area and a lead-out area, a part or all of said volumes having a higher recording density than a standard recording density determined by the CD format, absolute address information recorded in the program area and the lead-out area of each of said volumes being made of address information which continuously increments from an initial value without overlapping among the respective volumes, and address information recorded in the lead-in area of each of said volumes is made of address information of a system which is independent from the absolute address information recorded in the program area and the lead-out area.

According to this optical disk, absolute address information recorded in the program area and the lead-out area of each of the volumes is made of address information which continuously increments from an initial value without overlapping among the respective volumes and address information recorded in the lead-in area of each of the volumes is made of address information of a system which is independent from the absolute address information recorded in the program area and the lead-out area, limited address information can be allotted concentrically to the program area and the lead-out area excluding the lead-in area. Accordingly, the total amount of address information which can be allotted to the program area increases with the result that a larger amount of information can be recorded in a single optical disk. Further, since the absolute address information does not overlap among respective volumes, the function of address information for designating one address only can be maintained.

By constructing the address information recorded in the lead-in area and the absolute address information recorded in the program area and the lead-out area with mutually independent systems, even in the event that there has occurred overlapping between the two address information, the lead-in area can be distinguished from the program area and the lead-out area by a track number of Q-channel subcodes and, moreover, address information in the lead-in area and absolute address information in the program area and the lead-out area are recorded at separate positions on the Q-channel subcode format and, therefore, confusion between the two address systems will not be produced and no trouble will occur in the access operation.

The optical disk according to the invention can be constructed in such a manner that overlapping of address information in the lead-in area among the respective volumes can be avoided. Further, by forming digit of 10 of minute information in program information recorded in the program area and the lead-out area in hexadecimal, time length of 100 minutes or more can be expressed whereby the total amount of address information can be further increased and a further larger amount of information can be recorded.

Digit of 10 of minute information of address information in the lead-in area may also be formed in hexadecimal. In this case, by setting address information recorded in the lead-in area of the innermost first volume and absolute address information recorded in the program area and the lead-out area of the first volume to a value within a range (from 00 minute 00 second 00 frame to 99 minute 59 second 74 frame) determined by the CD format and also setting address information recorded in the lead-in area of the second and subsequent volumes to a value which is outside of the range determined by the CD format (i.e., from 100 minute 00 second 00 frame to F9 minute 59 second 74 frame), a reproduction device of a standard CD format cannot analyze address information in the lead-in area of the second and subsequent volumes whereby volume which the standard reproduction device can reproduce is limited to the first volume only.

In case address information in the lead-in area of the second and subsequent volumes is set to a value which is outside of the range determined by the CD format, address information recorded in the lead-in area of the second volume is made of address information which, e.g., increments continuously from the inner peripheral side of the disk and in which a final value ends with F9 minute 59 second and 74 frame.

In case 3 or more volumes are recorded in a single disk, address information recorded in the lead-in area of n-th volume (n being 3 or larger number) is made of address information which increments continuously from the inner peripheral side of the disk and in which a final value is continuous to a start address of address information in the lead-in area of n-1-th volume.

As another example of address information recorded in the lead-in area of the respective volumes, address information may be one which increments continuously from an initial value without overlapping among the respective volumes.

This optical disk can be utilized also for recording volume number identification information in a predetermined position (e.g., ZERO field of Q-channel subcodes) so that the reproduction device reads this identification information and uses it for accessing. The optical disk can be utilized also for recording data indicating that a next volume exists in a predetermined position of each volume (e.g., a main channel of the program area) so that the reproduction device reads this next volume existence information and uses it for judging whether access to the next volume should be allowed or prohibited.

There is also provided an optical disk reproduction device for reproducing an optical disk in which information is recorded in a CD format comprising a circuit for analyzing digit of 10 of minute information in address information read from the optical disk as hexadecimal. According to this optical disk reproduction device, an optical disk in which digit of 10 of minute information in absolute address information in the program area and the lead-out area or said absolute address information and address information in the lead-in area is recorded in hexadecimal can be reproduced.

For achieving the above described third object of the invention, there is provided an optical disk having a recording surface on which information prepared in accordance with a CD format is recorded and which is divided in the radial direction of the optical disk into a plurality of volumes each comprising a combination of a lead-in area, a program area and a lead-out area, information being recorded in an innermost first volume with a standard recording density determined by the CD format and information being recorded in a second and subsequent volumes on the outer peripheral side of the optical disk with a recording density which is higher than the standard recording density determined by the CD format, address information recorded in the lead-in area of the first volume and absolute address information recorded in the program area and the lead-out area of the first volume being made of address information within a range determined by the CD format and address information recorded in the lead-in area of the second and subsequent volumes being made of address information which is larger than a value determined by the CD format.

According to this optical disk, address information recorded in the lead-in area of the second and subsequent volumes is made of address information which is larger than a value determined by the CD format and, therefore, a standard reproduction device cannot analyze the address information recorded in the lead-in area of the second and subsequent volumes and hence cannot reproduce the second and subsequent volumes but can reproduce only the first volume. Accordingly, by recording main information such as a game software in the second and subsequent volumes, a standard reproduction device is prevented from reproducing the main information.

According to the CD format, address information is constructed of minutes, seconds and frames and these are expressed by 2 digit BCD code so that 99 minute 59 second 74 frame at the maximum can be expressed. By modifying a part of this format in such a manner that 4 bits prepared for expressing digit of 10 of minute information in address information recorded in the lead-in area in hexadecimal and a value of 100 minutes or more is allotted to address information in the lead-in area of the second and subsequent volumes, address information of a larger value than the range determined by the CD format can be provided while maintaining the manner of bit assignment of the CD format.

In one aspect of the invention, absolute address information recorded in the program area and the lead-out area of each of said volumes is made of address information which increments continuously from an initial value without overlapping among the respective volumes. By this arrangement, a sole address of the program area and the lead-out area can be determined. Since this address information is independent from address information in the lead-in area, limited address information resources can be exclusively used for the program area and the lead-out area so that time length allotted to these areas can be extended. Since the lead-in area can be distinguished from the program area and the lead-out area by the track number of Q-channel subcodes, no trouble will occur in operations even if address information in the lead-in area overlaps with address information in the program area and the lead-out area.

By recording information indicating existence of a next volume in each of the volumes in the form which cannot be analyzed by a standard reproduction device, the standard reproduction device can recognize only the first volume and, therefore, accessing of the standard reproduction device to the second and subsequent volumes can be prevented.

There is also provided an optical disk reproduction device for reproducing this type of optical disk comprising a circuit for analyzing address information within a range determined by the CD format and address information of a larger value than the value determined by the CD format. This optical disk reproduction device can reproduce all of the volumes of this optical disk.

The optical disk reproduction device may further comprise a control circuit for accessing an area on the outer peripheral side of the lead-out area of a currently reproduced volume to confirm existence of a next volume. According to this arrangement, the reproduction device can access each volume of this optical disk.

The optical disk reproduction device may also comprise a circuit which analyzes address information within a range determined by the CD format and address information of a larger value than the value determined by the CD format and a control circuit which reads, during reproduction of each of said volumes, the information indicating existence of a next volume and, when the information indicating existence of the next volume is available, allows access to the next volume whereas, when the information indicating the next volume is not available, prohibits access beyond the current volume. According to this arrangement, the reproduction device can access each volume of the optical disk.

BRIEF DESCRIPTION OF THE DRAWINGS

In the accompanying drawings,

FIG. 2 is a diagram showing constitution of Q-channel subcodes in a lead-in area in the CD format;

FIG. 3 is a diagram showing constitution of Q-channel subcodes in a program area and a lead-out area in the CD format.

DESCRIPTION OF PREFERRED EMBODIMENTS

Figure 1:
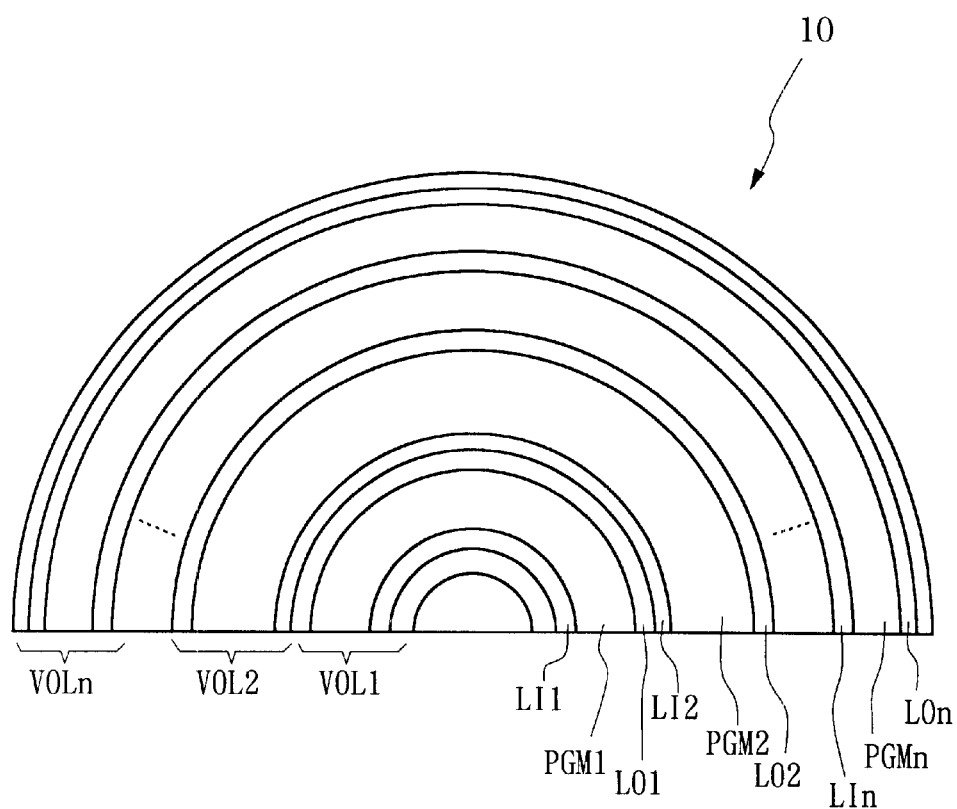
FIG. 1 is a plan view of an optical disk (only a half thereof is shown) which is an embodiment of the invention, showing an example of state of division of the recording surface in volumes.

A preferred embodiment of the optical disk made according to the invention will be described. FIG. 1 shows an example of the optical disk made according to the invention. The optical disk may either be a read-only type disk or a writable disk. The optical disk 10 has a prolonged total recording time of 100 minutes or more either by having a disk diameter of 12 cm which is the same as the diameter of the currently available CD and increasing recording density (i.e., by narrowing the track pitch or slowing down the linear volocity) or by enlarging the disk diameter while retaining the current recording density.

The recording surface of the optical disk 10 is divided in the radial direction of the disk into a plurality of areas to constitute volumes VOL1, VOL2, . . . . VOLn. The recording capacity of each volume VOL1, VOL2, . . . , VOLn is not constant but is variable depending upon the amount of data to be recorded. The recording density of each volume VOL1, VOL2 , . . . . VOLn need not be constant but may be arranged, for example, in such a manner that VOL1 has a standard recording density determined by the current CD format and VOL2 and subsequent volumes have a higher recording density than the standard recording density so that at least VOL1 can be read by the currently available standard CD players and CD-ROM players.

Each of the volumes VOL1, VOL2, . . . . VOLn is constructed of a lead-in area LI, a program area PRG and a lead-out area LO from the inner peripheral side of the disk and information of each area is recorded in the CD format. In the case of writable disks such as write-once disk and rewritable disk, innermost utility areas such as PCA (power calibration area) and PMA (program memory area) may be included in the first volume VOL1.

Figure 4:
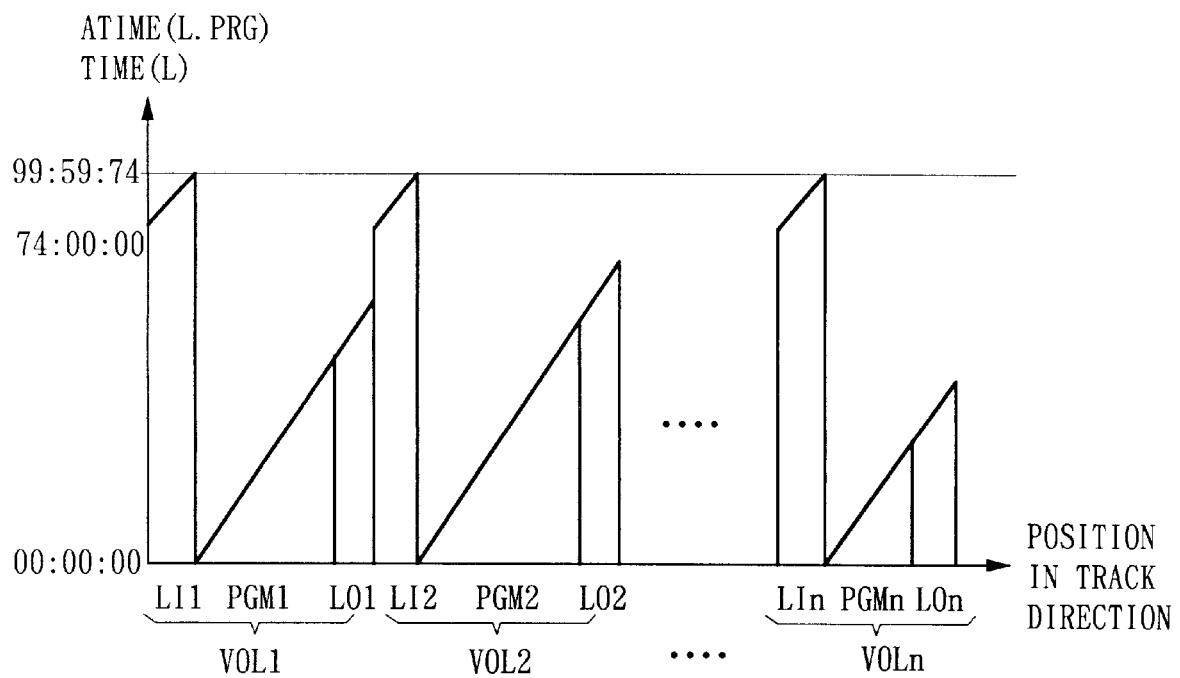
FIG. 4 is a diagram showing an example of progress of absolute time information ATIME in a program area PRG and a lead-out area LO and time information TIME in a lead-in area LI in each volume of the optical disk according to the invention.

The format of Q-channel subcodes in the lead-in area is shown in FIG. 2. The format of Q-channel subcodes in the program area and the lead-out area are shown in FIG. 3. In each figure, numbers in brackets designate number of bits. In the program area PGM and lead-out area LO of each volume, absolute time information ATIME representing an absolute position in each volume is recorded. FIG. 4 illustrates an example of progress of this absolute time information. In positions from the start position of the program area PGM to the end position of the lead-out area LO in each volume, absolute time information which increments continuously starting from an initial value 00:00:00 (i.e., 00 minute 00 second 00 frame) is recorded in ATIME (absolute time) in the format of Q-channel subcodes. In the lead-in area LI of each volume, time information which, e.g., increments continuously and ends at a final value of 99:59:74 is recorded as time information TIME in the format of Q-channel subcodes. In Q-channel subcodes of program information in each volume, track number TNO (e.g., number of music) and time within track TIME (e.g., time within the music) are recorded. The track number TNO is started from 1 in each volume. Track numbers TNO which are continuous from the inner peripheral side are given throughout the entire volumes. The time within track TIME starts from 00:00:00 in each track.

In all ZERO fields of Q-channel subcodes in the respective areas LI, PGM and LO of each volume, the volume number of each volume is recorded Since, however, the ZERO field of Q-channel subcodes in the utility area PMA of a writable disk has already been used, this ZERO field is not used for identifying the volume (i.e., the volume number is not recorded). Since ZERO field has 8 bits, 256 volumes at the maximum can be expressed. If 2 digit BCD code is used, 99 volumes at the maximum can be expressed.

In a case where, when time information such as start time and end time for each track in each volume is recorded in the innermost utility area PMA in a writable disk, an area for recording volume number information is not available in the PMA area, numbers which are continuous from the inner peripheral side are given as the track numbers TNO of the respective volumes throughout the entire volumes. By this arrangement, time information about all tracks of the entire volumes can be identifiably recorded without recording the volume number information in the PMA area.

At a predetermined position of final volume VOLn is recorded final volume identification information indicating that the volume is the final volume. For instance, since data of PFRAME field in PTIME when POINT=A0 in Q-channel subcodes in the lead-in area is 00 according to the current CD format, the final volume identification information can be recorded in this field.

More specifically, 00 is recorded as data of the PFRAME field for the first volume to the n-1-th volume and, for the n-th volume (final volume) only, FF(h), e.g., is recorded as the final volume identification information.

Alternaviely, since data of PSEC fiedl and PFRAME field of PTIME when POINT=A1 in Q-channel subcodes in the lead-in area is 00 according to the current CD format, FF(h), e.g., may be recorded as the final volume identification information in either or both of these fields. Further alternatively, as to the lead-in area of the final volume, FF(h), e.g., may be recorded as the final volume identification information instead of recording a volume number at the ZERO field of Q-channel subcodes. In this case, the maximum value of volume number information is restricted to FE(h) so as to avoid overlapping with the final volume identification information. In case the volume number information is expressed in 2 digit BCD, the maximum value of the volume number information is restricted to 99 and the final volume identification information is set at, e.g., FF(h).

Alternatively, since data of PSEC field and PFRAME field of PTIME when POINT=A1 in Q-channel subcodes in the lead-in area is 00 according to the current CD format, FF(h), e.g., may be recorded as the final volume identification information in either or both of these fields. Further alternatively, as to the lead-in area of the final volume, FF(h), e.g., may be recorded as the final volume identification information instead of recording a volume number at the ZERO field of Q-channel subcodes. In this case, the maximum value of volume number information is restricted to FF(H) so as to avoid overlapping with the final volume identification information. In case the volume number information is expressed in 2 digit BCD, the maximum value of the volume number information is restricted to 99 and the final volume identification information is set at, e.g., FF(h).

The recording density of each volume is restricted to less than 100 minutes. By this arrangement, even if absolute time information in Q-channel subcodes remains the same as the current CD format, all volumes can be reproduced with current CD players and CD-ROM players so long as performances of the optical pickup and servo circuit are satisfactory. If digit of 10 in minute information of absolute time information in Q-channel subcodes is expressed in hexadecimal, volumes having recording density of 100 minutes or more can be recorded. More specifically, according to the CD format, 8 bits are provided for expressing minute information MIN of absolute time information ATIME in Q-channel subcodes in 2 digit BCD code. By expressing more significant 4 bits used for expressing digit of 10 in the minute information MIN in hexadecimal while retaining less significant 4 bits used for expressing digit of 1 in BCD code, the digit of 10 of the minute information MIN can be expressed from 0 to 15(F) and the digit of 1 can be expressed from 0 to 9 so that the minute information MIN as a whole can be expressed from 00 to F9 (=0 to 159 minutes). Accordingly, absolute time information ATIME as a whole can be expressed from 00:00:00 to 159:59:74. More significant 4 bits of minute information MIN of TIME in Q-channel subcodes in the lead-in area may also be expressed in hexadecimal.

Figure 5:
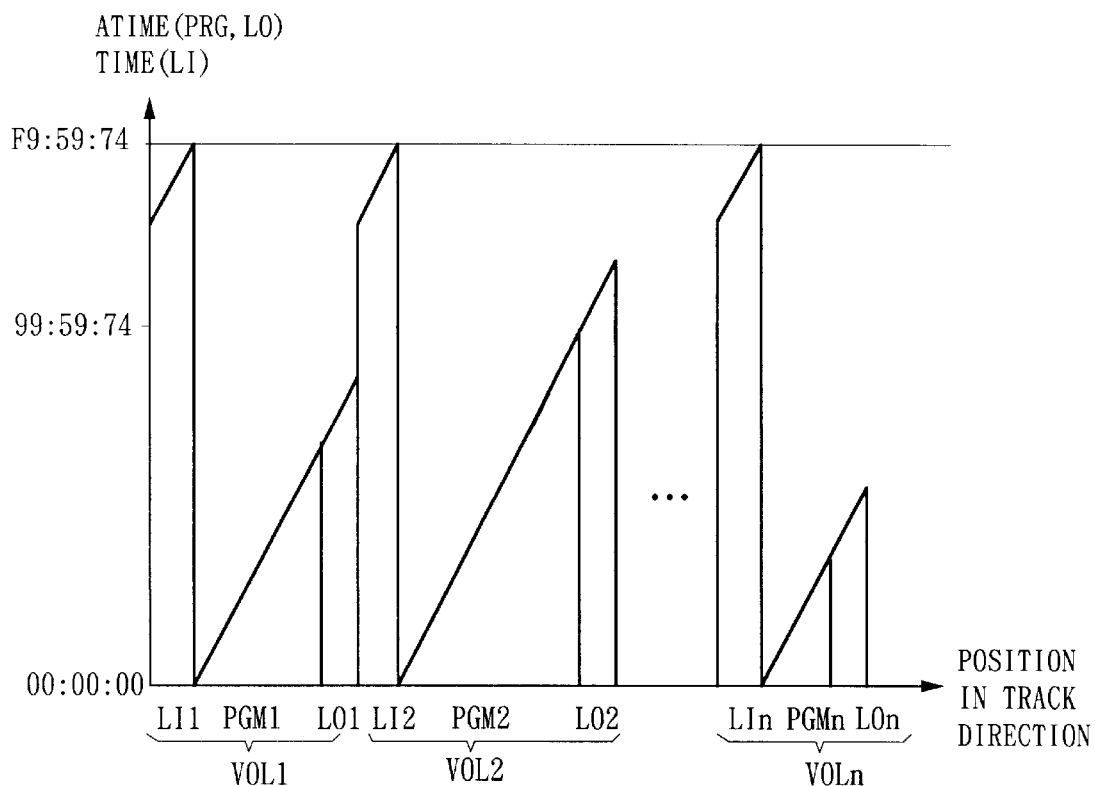
FIG. 5 is a diagram showing another example of progress of absolute time ATIME in the program area PRG and the lead-out area LO and time information TIME in the lead-in area LI in each volume of the optical disk according to the invention.

An example of progress of absolute time information ATIME of an optical disk in which volumes of recording capacity of 100 minutes or more are recorded is shown in FIG. 5. An optical disc reproduction device for reproducing this optical disk has a control circuit which is adapted to treat digit of 10 of minute information MIN of absolute time information ATIME in Q-channel subcodes in the program and lead-out areas and digit of 10 of minute information MIN of time information TIME in Q-channel subcodes in the lead-in area respectively in hexadecimal. If recording capacity of the first volume is restricted to less than 100 minutes, the same data is available in BCD code and hexadecimal code until the digit of 10 reaches 9 and, accordingly, the first volume can be reproduced by current CD players and CD-ROM players.

A specific example of information to be recorded in each volume is shown in Table 1.

TABLE 1

|  | first volume VOL1 | second volume VOL2 | third volume VOL3 | fourth volume VOL4 | fifth volume VOL5 |
|---|---|---|---|---|---|
| Ex. 1 | hit numbers of player A | hit numbers of player B | hit numbers of player C | — | — |
| Ex. 2 | 94 numbers of player A | 95 numbers of player A | 96 numbers of player A | 97 numbers of player A | — |

TABLE 1-continued

|  | first volume VOL1 | second volume VOL2 | third volume VOL3 | fourth volume VOL4 | fifth volume VOL5 |
|---|---|---|---|---|---|
| Ex. 3 | data contents of VOL2 and after | common data | data for Windows | data for MAC | data for UNIX |

In Example 1 in Table 1, hit music numbers of players A, B and C are recorded in the first to third volumes VOL1 to VOL3. Each music number of each player is identified by track number TNO of Q-channel subcodes in each volume. Time elapsed in each volume is expressed by absolute time information ATIME of Q-channel subcodes and time elapsed in each music number is expressed by time information within the music number TIME of Q-channel subcodes.

In Example 2, music numbers of a single player A compiled annually are recorded in the first to fourth volumes VOL1 to VOL4. Each music number in each year is identified by track number TNO of Q-channel subcodes in each volume. Time elapsed in each volume is expressed by absolute time information ATIME of Q-channel subcodes and time elapsed in a music number is expressed by time information within the music number TIME of Q-channel subcodes. Music numbers compiled by album may be recorded instead of music numbers compiled annually.

In Example 3, data of a computer program (e.g., application software such as a computer game) of the same contents prepared for different operation systems is recorded in each volume. In the first volume VOL1, a table of contents of data stored in the second volume VOL2 and subsequent volumes is recorded. In the second volume VOL2, data which is common for respective operation systems is recorded. In the third volume VOL3, data for Windows™ is recorded. In the fourth volume VOL4, data for MAC™ is recorded. In the fifth volume VOL5, data for UNIX™ is recorded. Addresses in each volume are expressed by absolute time information ATIME of Q-channel subcodes in each volume. In addition to these examples, it is also possible to record, for example, a plurality of computer programs for the same operation system in the respective volumes.

Figure 6:
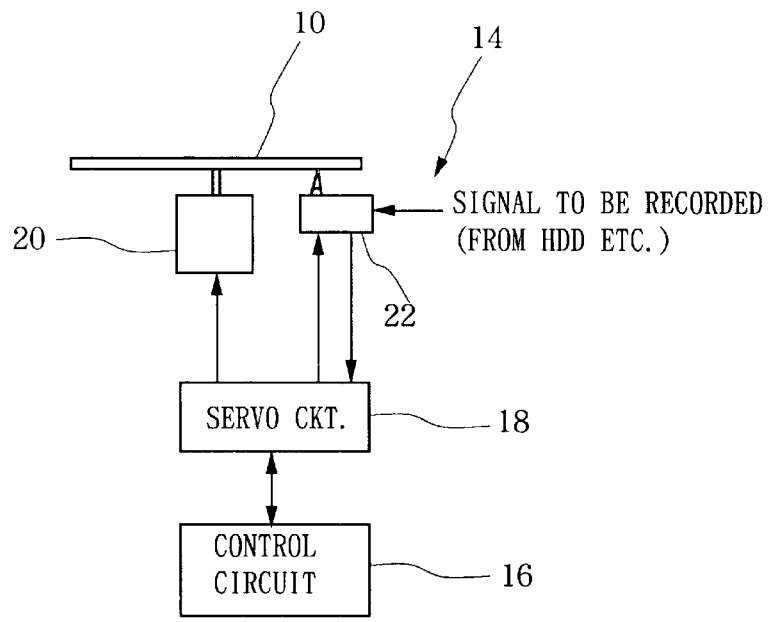
FIG. 6 is a block diagram showing an embodiment of the optical disk recording device according to the invention.

An example of an optical disk recording device for producing the optical disk according to the invention will be described with reference to FIG. 6.

An optical disk 10 is a write-once type disk or a rewritable disk and has an increased total recording capacity by having a narrower track pitch or a larger disk diameter than a currently available CD format disk. In the optical disk recording device 14, signals to be recorded are prepared in the format made according to the present invention and are prestored in a hard disk device or the like device. Upon issuance of a record command and reading of signals to be recorded from the hard disk device, a control circuit 16 controls a servo circuit 18 which in turn controls a spindle motor 20 and an optical head 22 to record the signals to be recorded on the optical disk 10 thereby producing the optical disk 10 of the present invention.

An example of an optical disk reproduction device for reproducing the optical disk according to the invention will be described with reference to FIG. 7.

A disk reproduction device 30 is composed of a CD-ROM player 26 and a host computer 28. The host-computer 28 supplies, in accordance with operation of a key board 24 by an operator, various operation commands to the CD-ROM player 26 through a transmission cable 32. The CD-ROM player 26 receives these operation commands in a control circuit 36 through an interface circuit 34 and a servo circuit 38 controls a spindle motor 40 and an optical pickup 42 to read recorded information from the optical disk 10.

Signals recorded by the optical pickup 42 are applied to a Red decoder 44 which performs a CD signal processing in accordance with the Red Book standard. The decoded signals are further applied to a Yellow decoder 46 which performs a CD-ROM signal processing in accordance with the Yellow Book standard. The decoded signals are delivered out through the interface circuit 34 and applied to the host computer 28 through the transmission cable 32. When a signal reproduced by the CD-ROM player 26 is an audio signal, the host computer 28 reproduces it through a loudspeaker 48 and, when a signal reproduced by the CD-ROM player 26 is a video signal, the host computer 28 displays it on a display 50. The display 50 may display also volume number, track number, time within track and absolute time of a signal which is being reproduced.

An outline of the reproduction operation by the optical disk reproduction device shown in FIG. 7 will now be described with reference to FIG. 8. Upon loading of the optical disk 10 in the CD-ROM player 26 (S1), TOC information of all of the volumes is read (S2) and all TOC information is stored in a memory of the host computer 28 (or a memory of the control circuit 36 of the CD-ROM player 26). Since the track number TNO and various start times overlap with one another between volumes, a table (memory area) for each volume is prepared and controlled. Upon issuance of a search command for a certain track in a certain volume by, e.g., operation of the operator (S3), a search operation is made on the basis of volume number information read from the optical disk 10 and absolute time information (S4). Upon completion of search at the instructed position (S5), reproduction is started from that position (S6).

Figure 8:
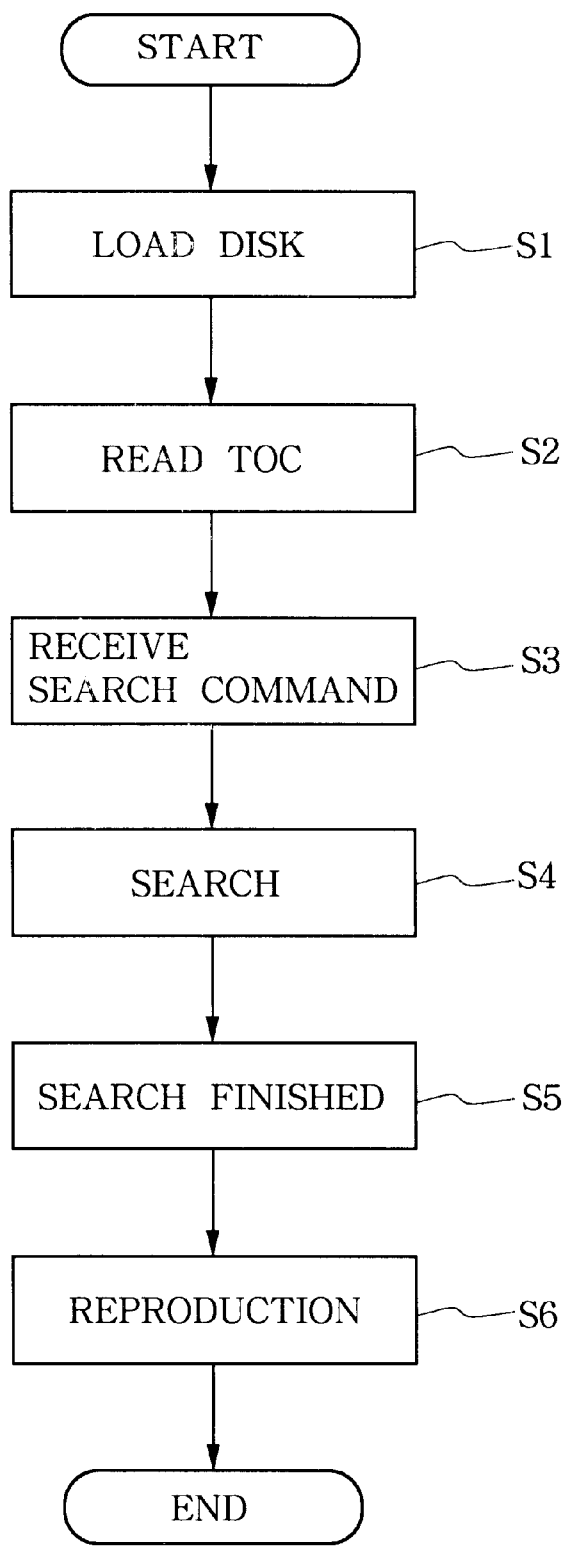
FIG. 8 is a flow chart schematically showing a reproduction operation of the optical disk reproduction device of FIG. 7.
Figure 9:
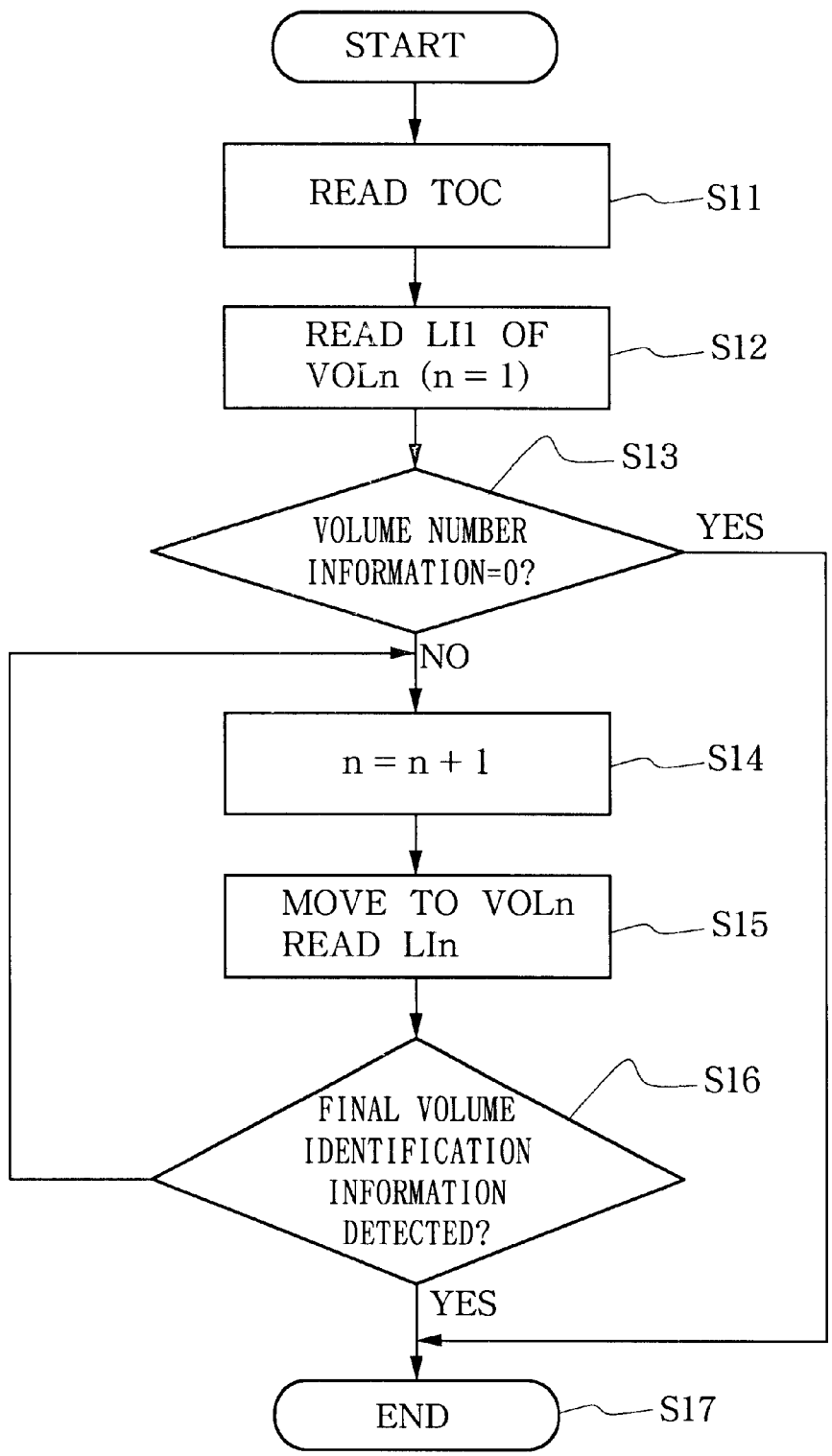
FIG. 9 is a flow chart showing an example of a specific routine of the step S2 in FIG. 8 for reading TOC information of the entire volumes.

An example of a specific routine of the step S2 of FIG. 8 for reading TOC information of all volumes is shown in FIG. 9. This is an example in which the volume number information recorded in the optical disk starts from 1. An example of Q-channel subcode information in the lead-in area of the first volume recorded in the optical disk at this time is shown in Table 2. In ZERO field, 1 is recorded as the volume number information.

TABLE 2

| CNT/ADD | TNO | POINT | TIME | ZERO | PTIME |
|---|---|---|---|---|---|
| 41 | 00 | 01 | 98:00:00 | 01 | 00:02:00 |
| 41 | 00 | 01 | 98:00:01 | 01 | 00:02:00 |
| 41 | 00 | A0 | 98:00:02 | 01 | 01:00:00 |
| 41 | 00 | A0 | 98:00:03 | 01 | 01:00:00 |
| 41 | 00 | A0 | 98:00:04 | 01 | 01:00:00 |
| 41 | 00 | A1 | 98:00:05 | 01 | 01:00:00 |
| 41 | 00 | A1 | 98:00:06 | 01 | 01:00:00 |
| 41 | 00 | A1 | 98:00:07 | 01 | 01:00:00 |
| 41 | 00 | A2 | 98:00:08 | 01 | 40:00:00 |
| 41 | 00 | A2 | 98:00:09 | 01 | 40:00:00 |
| 41 | 00 | A2 | 98:00:10 | 01 | 40:00:00 |

Description will now be made about FIG. 9. Upon issuance of a TOC information read command (S11), the optical pickup 42 is displaced from the innermost position radially outwardly to read information in the lead-in area of the first volume (S12). TOC information of the first volume read from the lead-in area is stored in a memory of the host computer 28 or a memory of the control circuit 36. At this time, the host computer 28 detects that data at ZERO field of Q-channel subcodes is 1 and thereby judges that a plurality of volumes are recorded in the optical disk 10 (S13). The host computer 28 accesses the reproduction position of the optical pickup 42 forwardly by time length (40:30:00) which is a sum of start time of the lead-out area recorded in PTIME when POINT of Q-channel subcodes is A2 (40:00:00 in the example of Table 2) and lead-out length (e.g., 00:30:00) (S14) and resumes reproduction from the start position of the lead-in area of the second volume (S15). TOC information of the second volume read from the lead-in area of the second volume is stored in the memory of the host computer 28 or the memory of the control circuit 36. The above operation is repeated and TOC information of each volume is sequentially stored in the memory of the host computer 28 or the control circuit 36. Upon detection of the final volume identification information (S16), reading of TOC information of this volume is ended and reading of TOC information of all volumes thereby is completed (S17). In this manner, TOC information of all of the volumes is stored in the memory of the host computer 28 or the control circuit 36 before reproduction for utilization in subsequent operations including search.

Figure 10:
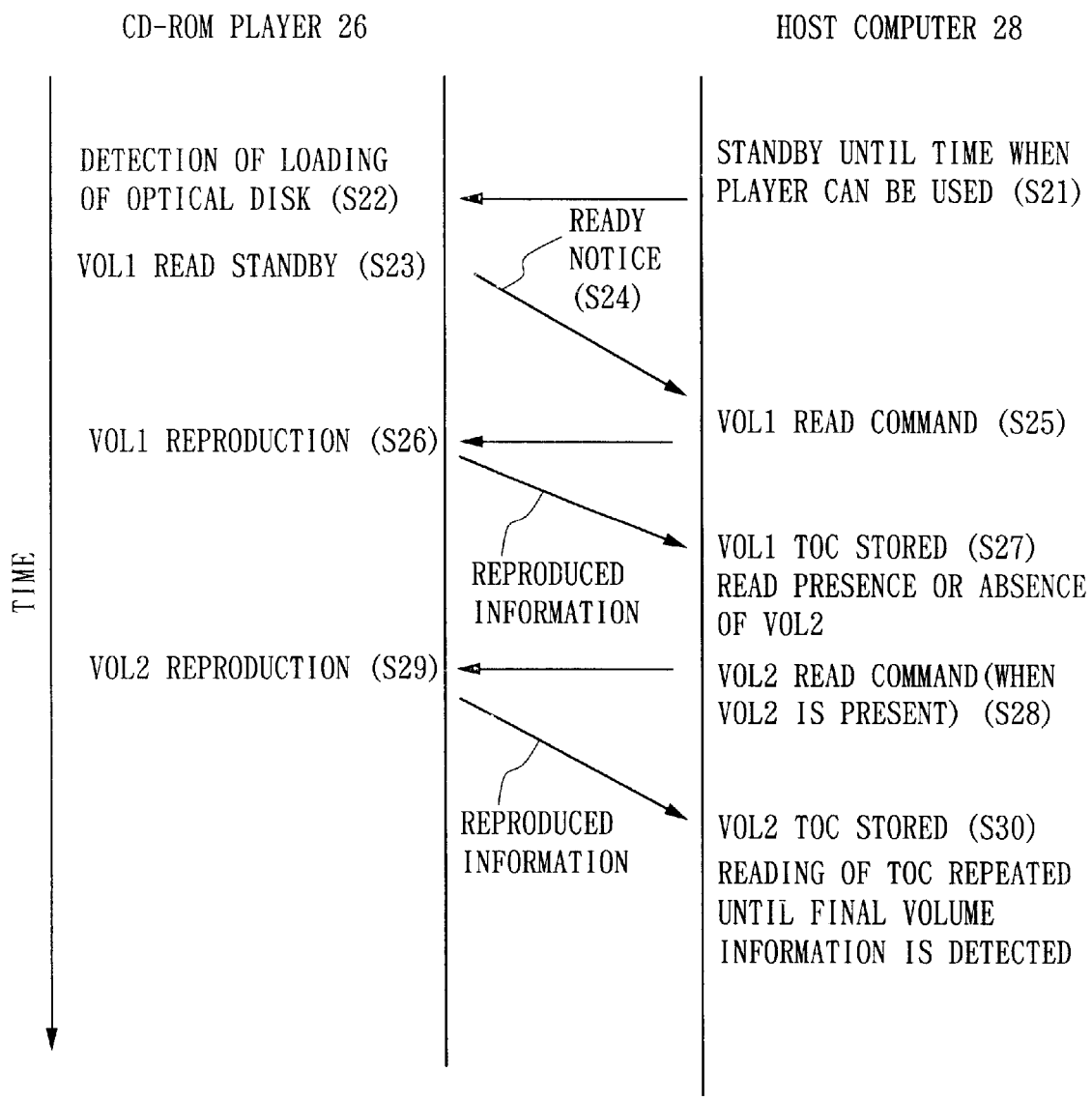
FIG. 10 is a flow chart showing another example of a specific routine of the step S2 in FIG. 8 for reading TOC information of the entire volume.

Another example of a specific routine of step S2 for reading TOC information of all volumes is shown in FIG. 10. This is an example in which the volume number information recorded in the optical disk starts from 0. In FIG. 10, contents of exchange of data between the host computer 28 and the CD-ROM player 26 are illustrated in timewise order. The host computer 28 is in a stand-by state until the CD-ROM player 26 is brought into a reproduction mode (S21). Upon detection of loading of the optical disk 10 by the CD-ROM player 26 (S22), the first volume is brought into a read stand-by mode (S23) and a ready signal indicating this state is supplied to the host computer 28 (S24). Upon receipt of this signal, the host computer 28 issues a command to reproduce the first volume (S25). Upon receipt of this command, the CD-ROM player 26 reproduces the first volume (S26) and supplies reproduced information to the host computer 28 which stores TOC information of the first volume in its memory (S27) (alternatively, the TOC information is stored in a memory of the control circuit 36).

In case information indicating presence or absence of the second volume in the program area of the first volume, reproduction of the program area of the first volume is made continuously after finishing reproduction of the lead-in area of the first volume (S26). When information indicating that there is no second volume has been provided, reading of TOC information is finished. When information that the second volume is present has been provided, a command to read the lead-in area of the second volume is issued (S28). Upon receipt of this command, the CD-ROM player 26 reproduces the lead-in area of the second volume and transmits reproduced information to the host computer 28 (S29). Upon receipt of this information, the host computer 28 stores TOC information in its memory (S30) (alternatively, this information is stored in the memory of the control circuit 36). The host computer 28 also detects presence or absence of the third volume from information of ZERO filed of Q-channel subcodes and, when there is the third volume, the lead-in area of the third volume is reproduced and its TOC information is stored in the memory of the host computer 28 or the control circuit 36. When final volume identification information has been provided, reading of TOC information of the final volume is finished and reading of TOC information of all volumes thereby is ended. In this manner, TOC information of all volumes is stored in the memory of the host computer 28 or the control circuit 36 for utilization in subsequent operations including search.

Figure 19:
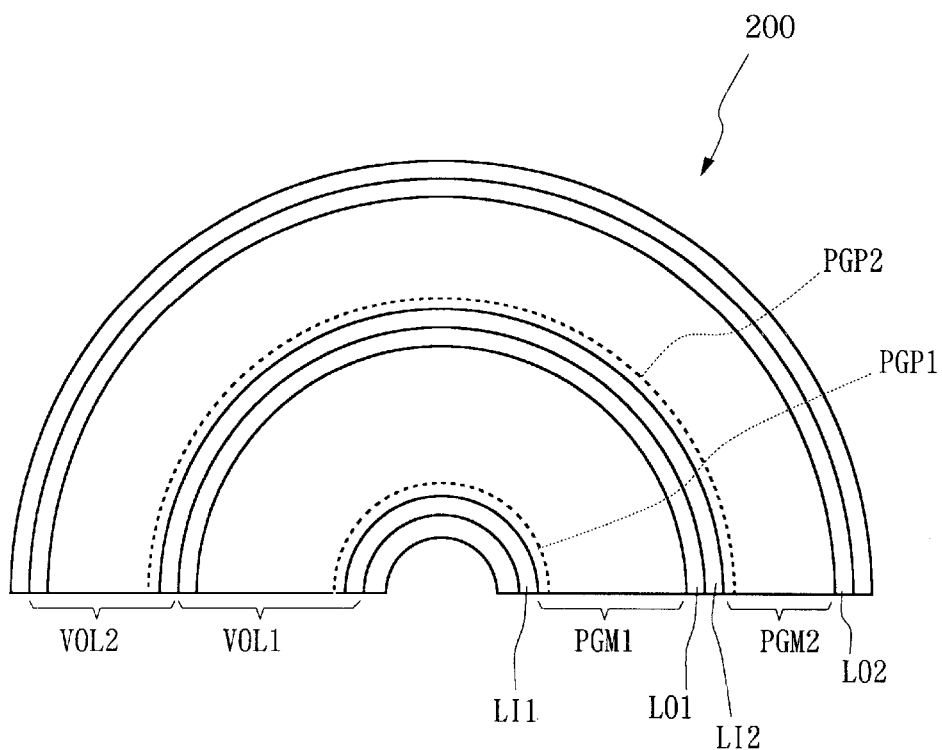
FIG. 19 is a plan view of the optical disk (only a half thereof is shown), showing an example of state of division of the recording surface in volumes.

In the examples of FIGS. 9 and 19, TOC information is obtained by exchange of data between the host computer 28 and the CD-ROM player 26. It is also possible to provide the TOC information by the CD-ROM player 26 only (i.e., by the control circuit 36 only).

Figure 11:
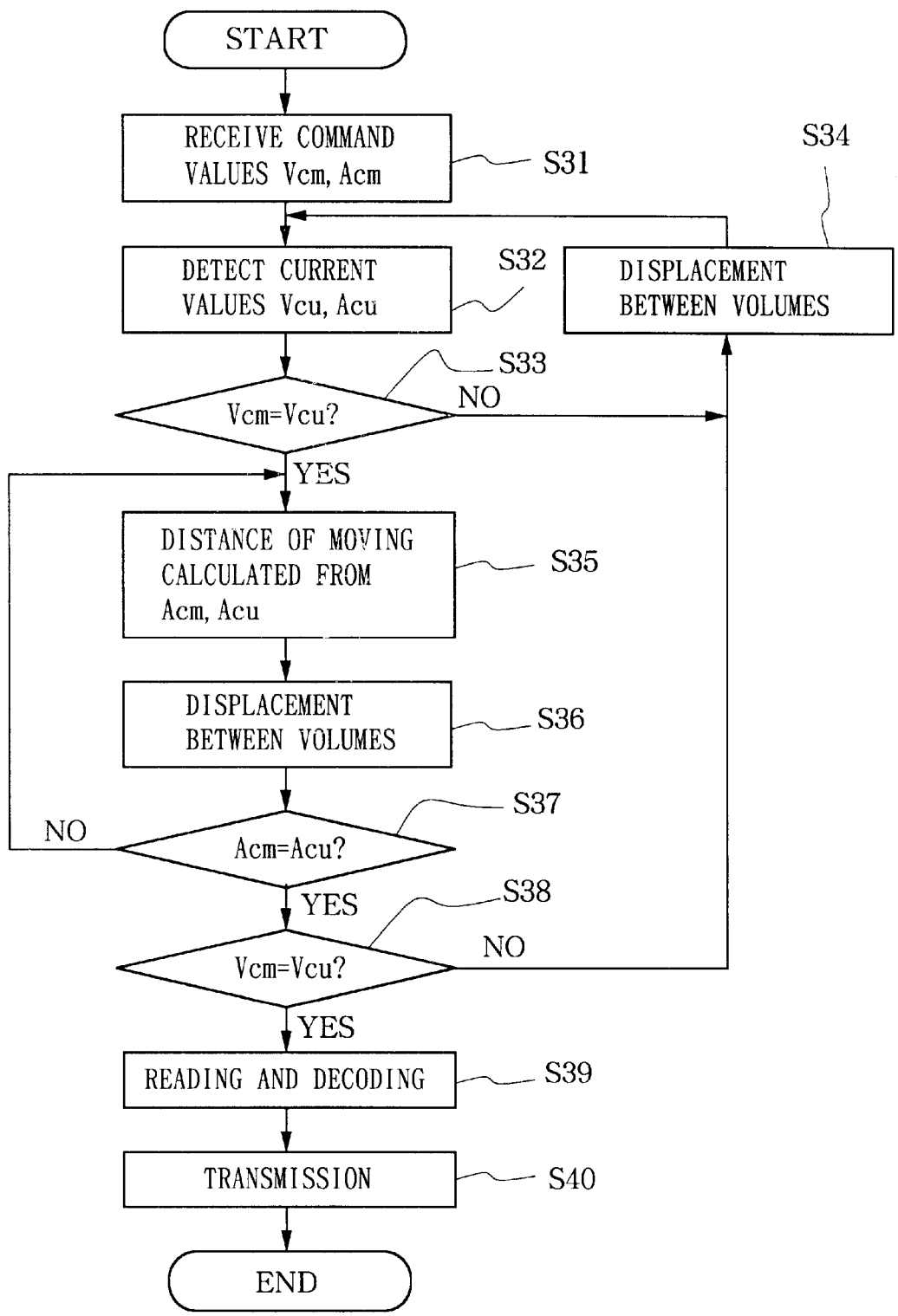
FIG. 11 is a flow chart showing an example of a search operation in the optical disk reproduction device of FIG. 7.

A search operation of the optical disk reproduction device 30 of FIG. 7 in response to the TOC information of all volumes stored in the memory of the host computer 28 or the control circuit 36 will now be described. Upon issuance of a command by, e.g., an operation by the operator for searching a specific address (absolute time) in a specific volume of the optical disk 10, this command is transmitted from the host computer 28 to the control circuit 36 of the CD-ROM player 26. The control circuit 36 implements the search in response to this command. An example of search by the control circuit 36 is shown in FIG. 11. Upon receipt of volume command value Vcm and address command value Acm (S31), volume current value Vcu and address current value Acu are obtained as current position information of the optical pickup 42 from decoded output of the Red decoder 44 (S32). In case volume number information starts from 0, a value obtained by adding 1 to a detected value is used as the volume current value Vcu. The address current value Acu can be known from Q-channel subcodes. TNO=0 represents the lead-in area and data of the TIME area constitutes the address current value Acu. When TNO is not 0, that state indicates the program area or the lead-out area and data of the ATIME area constitutes the address current value Acu.

Whether the command value Vcm and the current value Vcu about the volume coincide with each other is judged (S33). In case there is no coincidence, the optical pickup 42 is displaced to an adjacent volume in the direction in which the optical pickup 42 approaches the volume command value Vcm (S34). In case the volume command value Vcm is located on the inner peripheral side of the disk, the distance of displacement of the optical pickup 42 is set, for example, at a distance which corresponds to time length obtained by adding predetermined short length of time to a sum of the address current value Acu and lead-in length of the current volume. In case the volume command value Vcm is on the outer peripheral side of the disk, the distance of displacement of the optical pickup 42 is set, for example, at a distance which corresponds to time length obtained by adding lead-out length of the current volume to a value obtained by subtracting the address current value Acu from lead-out start time of the current volume which is obtained as data at POINT=A2 of Q-channel subcodes in the lead-in area. By causing the optical pickup 42 to displace compulsorily by thus calculated distance, the optical pickup 42 is moved to the adjacent volume. By repeating this operation, the optical pickup 42 reaches the volume which is the object of the command by the volume command value Vcm.

Then, a control for reaching the address command value Acm in the volume is carried out. First, subtraction of the address current value Acu from address command value Acm is made to obtain distance of displacement of the optical pickup 42 corresponding to the difference (S35). Then, the optical pickup 42 is displaced compulsorily by the distance (S36). Upon reaching of the optical pickup 42 to the position which is directed by the address command value Acm (S37), whether or not the optical pickup 42 has entered a wrong volume due to skipping caused by a scratch or the like defect on the optical disk 10 is confirmed (S38). When Vcm coincides with Vcu, the search operation is finished and reading of data is started from this position. Data read from the optical disk 10 is decoded by the Red decoder 44 and the Yellow decoder 46 (S39) and transmitted to the host computer 28 (S40). The algorithm of FIG. 11 is utilized also in securing TOC information in the step S2 of FIG. 8.

Figure 7:
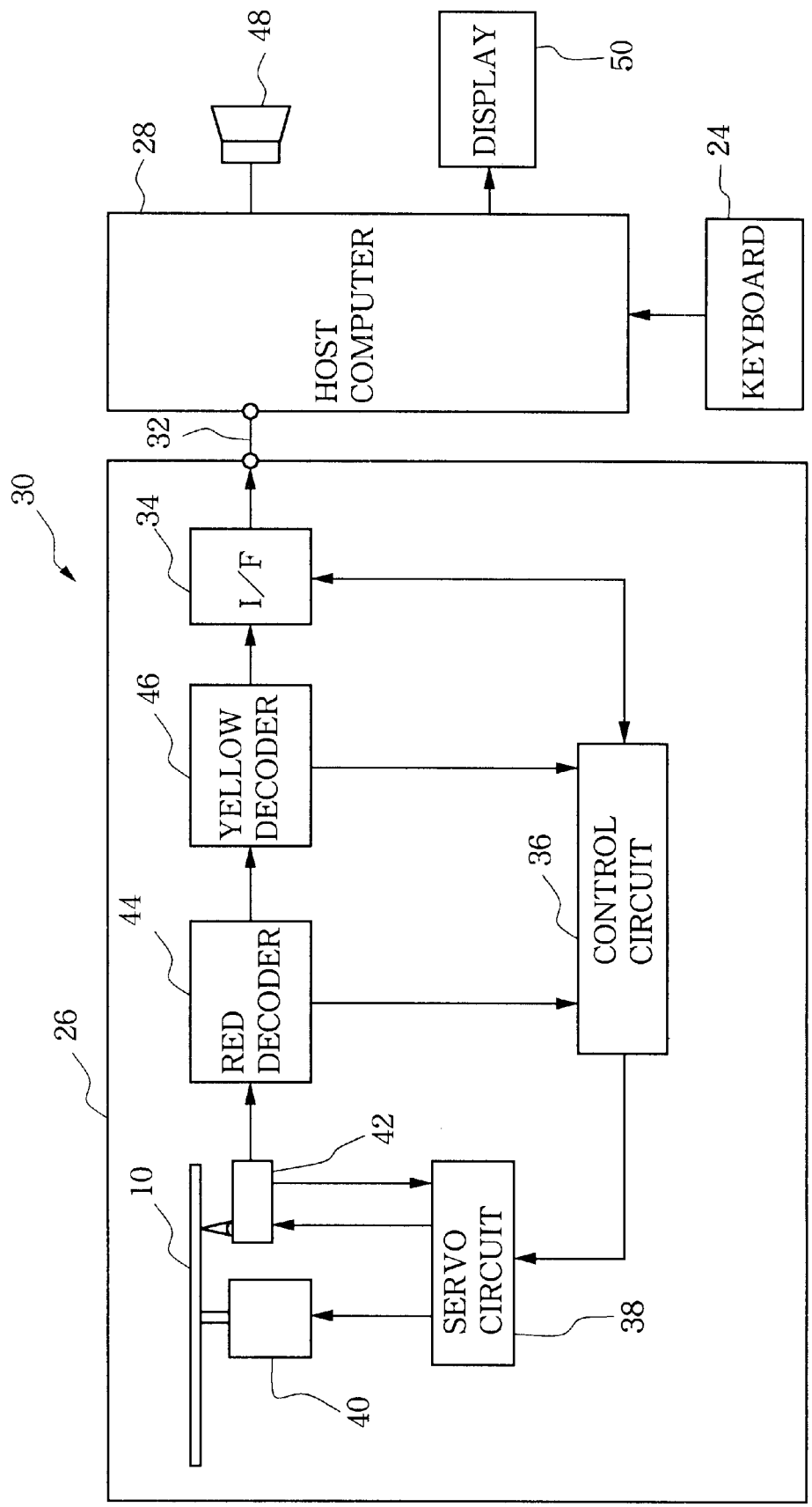
FIG. 7 is a block diagram showing an embodiment of the optical disk reproduction device according to the invention.

In case the optical disk shown in Example 3 of Table 1 is used in the optical disk reproduction device 30 of FIG. 7, the following operation is carried out in accordance with the operation system used in the host computer 28. If Windows is used in the host computer 28, the host computer 28 reads contents of the first volume VOL1 and accesses to the second volume VOL2 and third volume VOL3. If MAC is used in the host computer 28, the host computer 28 reads contents of the first volume VOL1 and accesses to the second volume VOL2 and the fourth volume VOL4. If UNIX is used in the host computer 28, the host computer 28 reads contents of the first volume VOL1 and accesses to the second volume VOL2 and the fifth volume VOL5.

Figure 12:
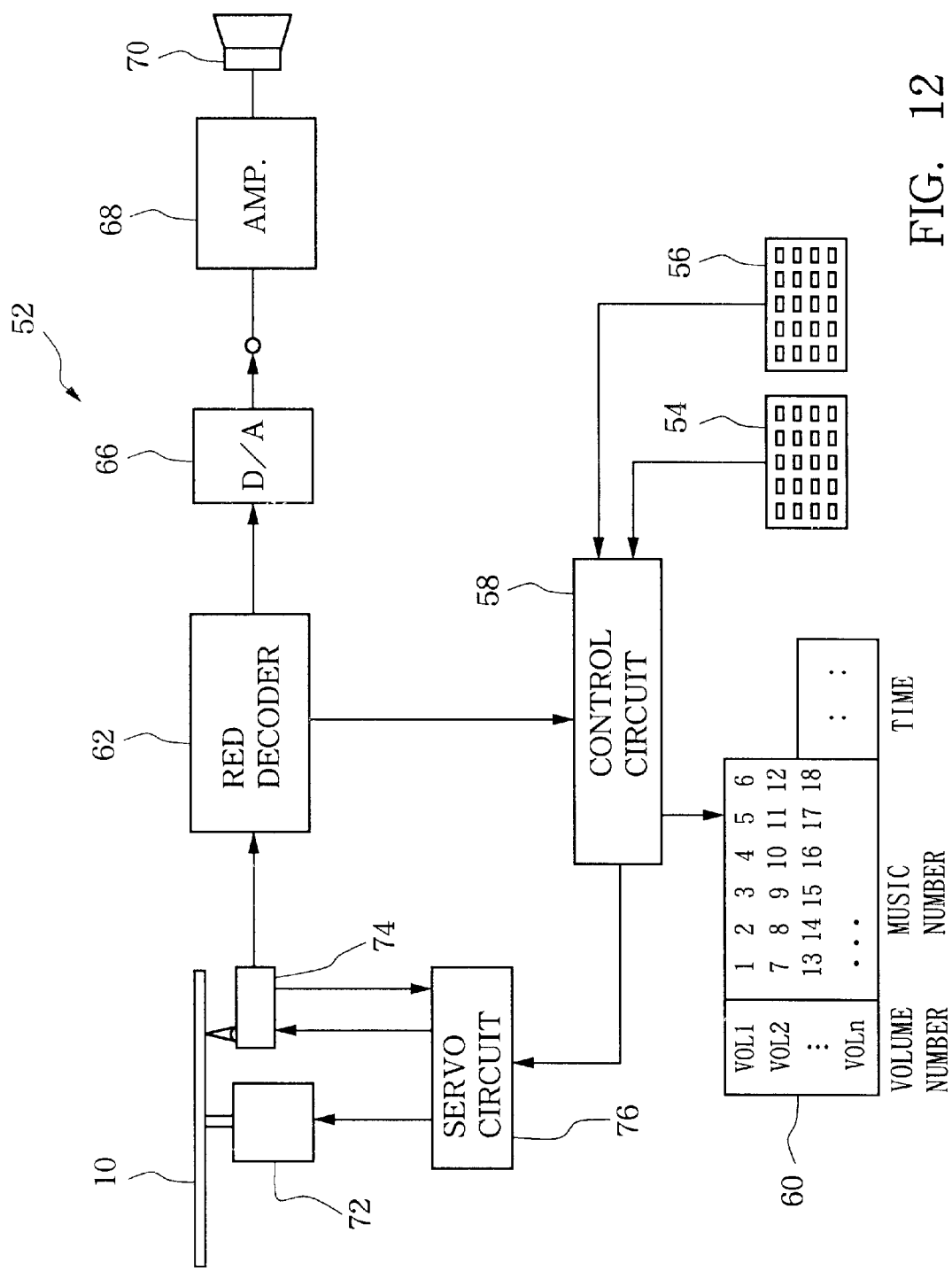
FIG. 12 is a block diagram showing an embodiment of the invention in which the optical disk reproduction device of the invention is constructed as a CD player.

The reproduction device of this invention can be constructed as a CD player used exclusively for reproducing the optical disk of the invention. An example of such construction is shown in FIG. 12. An optical disk 10 is rotated by a spindle motor 72 and information on the optical disk 10 is read by an optical pickup 74. Operations of the spindle motor 72 and the optical pickup 74 are controlled by a servo circuit 76 in accordance with commands from a control circuit 58. The CD player 52 has a volume number selection button 54 and a music number (track number) selection button 56. A command for a music number by the music number selection button 56 corresponds to a command for designating absolute time of a position at which the corresponding music (track) is started. Upon loading of the optical disk 10, the control circuit 58 reads TOC information of all volumes by the operation described previously with respect to the optical disk reproduction device 30 of FIG. 7 and stores the TOC information in its memory. Upon designating a volume number and a music number by operation of the selection buttons 54 and 56, the corresponding position on the optical disk 10 is searched and reproduction is started by the operation described previously with respect to the optical disk reproduction device 30 of FIG. 7. A signal read from the optical disk 10 is decoded by a Red decoder 62, provided through a digital-to-analog converter 66, amplified by an amplifier 68 and reproduced from a loudspeaker 70. During the reproduction, a display 60 displays the volume number and music number under reproduction by intermittent lighting. The display 60 also displays time within the music under reproduction and, when necessary, its absolute time.

Another embodiment of the optical disk according to the invention which achieves the above described second object of the invention will now be described with reference to FIGS. 13 and 14.

In this embodiment, the recording surface of the optical disk 100 is divided into three volumes. FIG. 14 illustrates the construction of this optical disk 100. The optical disk 100 has a disk diameter of 12 cm which is the same as the currently available CD. The recording surface of the optical disk 100 is divided in the radial direction of the disk into three continuous volumes of VOL1, VOL2 and VOL3. The recording density of the respective volumes VOL1, VOL2 and VOL3 is made higher than the recording density of the current CD format by, e.g., narrowing the track pitch (interval between adjacent tracks). A part of the volumes, e.g., the first volume VOL1, may have the recording density of the current CD format.

Each of the volumes VOL1, VOL2 and VOL3 consists of a lead-in area LI, a program area PGM and a lead-out area LO from the inner peripheral side of the disk and information of each area is recorded in a CD-ROM format. In the lead-in area LI is recorded TOC information of its volume. The first volume VOL1 may contain a utility area.

The format of Q-channel subcodes in the lead-in area of this optical disk 100 is similar to the format of the previously described optical disk 10 which is shown in FIG. 2 and the formats of the Q-channel subcodes in the program area and the lead-out area are similar to those of the previously described optical disk 10 which is shown in FIG. 3, so that reference will be made to these FIGS. 2 and 3 again in describing the formats of the optical disk 100 of the present embodiment. In the program area PGM and the lead-out area LO of each volume is recorded absolute address information ATIME indicating absolute position in each volume. In the lead-in area LI of each volume is recorded address information TIME in the Q-channel subcodes. In Q-channel subcodes of the program area and the lead-out area of each volume is recorded information including a track number TNO and time within track (time within music) TIME. The track number TNO starts from 1 for each volume. In the track number TNO in the lead-in area of each volume is recorded 0. Accordingly, even when an overlapping value is used as absolute address information ATIME in the program area and the lead-out area and also as address information TIME in the lead-in area, the two positions can be distinguished from each other by judging whether the track number TNO is 0 or not.

Digit of 10 of minute information in address information TIME in the lead-in area and absolute address information ATIME is expressed in hexadecimal. More specifically, according to the CD format, 8 bits are provided for expressing minute information MIN and AMIN of address information TIME and absolute address information ATIME in Q-channel subcodes in 2 digit BCD code. By expressing more significant 4 bits used for expressing digit of 10 in the minute information MIN and AMIN in hexadecimal while retaining less significant 4 bits used for expressing digit of 1 in BCD code, the digit of 10 of the minute information MIN and AMIN can be expressed from 0 to 15(F) and the digit of 1 can be expressed from 0 to 9 so that the minute information MIN and AMIN as a whole can be expressed from 00 to F9 (=0 to 159) minute. In the range of 0 to 99 minute, the minute information assumes the same value.

Figure 13:
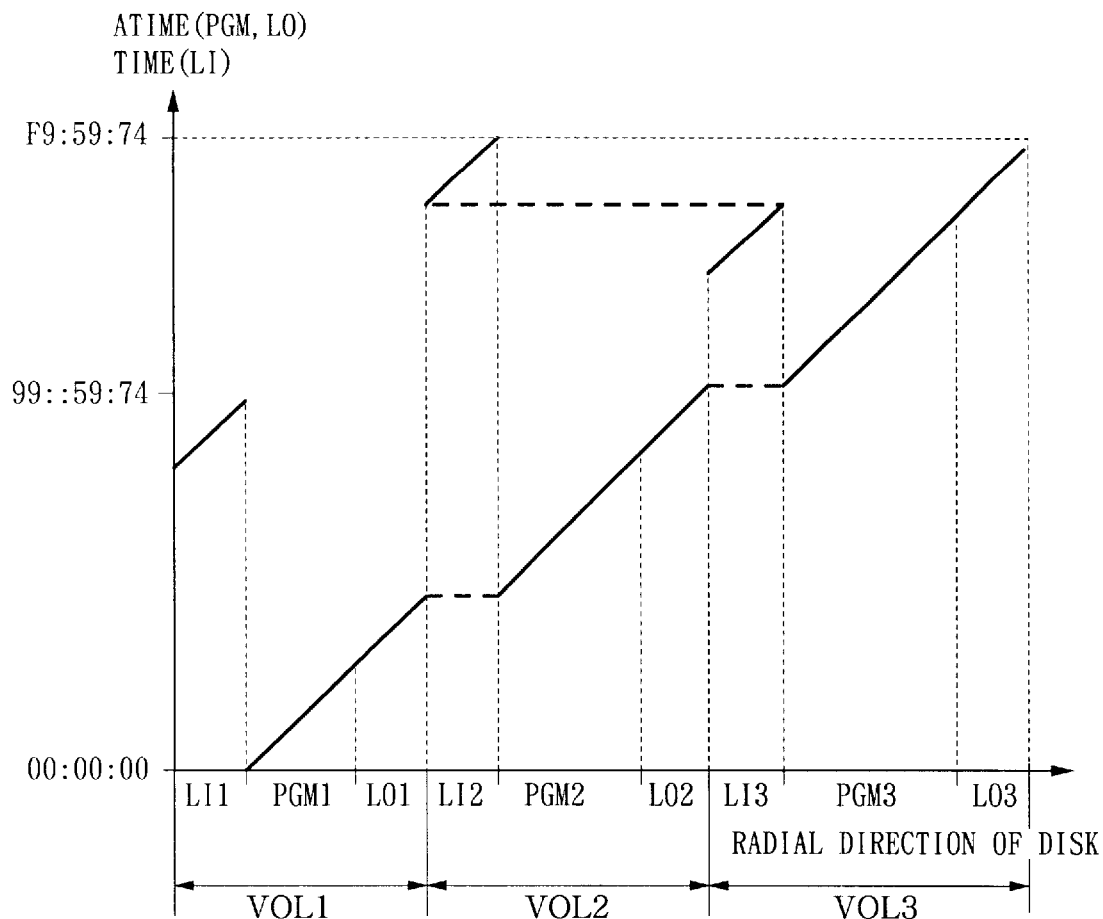
FIG. 13 is a diagram showing an example of address information imparted to respective positions in the radial direction of the optical disk of FIG. 14 which is another embodiment of the invention.

An example of address information (absolute address information ATIME in the program area and the lead-out area and address information TIME in the lead-in area) allotted to respective positions in the radial direction of the optical disk 100 is shown in FIG. 13. In the first volume VOL1, address information TIME in the lead-in area LI1 is allotted in such a manner that it continuously increments from the inner peripheral side of the disk so that it ends at 99 minute 59 second 74 frame which is the maximum value in the CD format. Absolute address information ATIME in the program area PGM1 and the lead-out area LO1 in VOL1 is allotted as a value which starts from the initial value of 00 minute 00 second 00 frame and continuously increments from the inner peripheral side of the disk so that it ends within 99 minute 59 second 74 frame.

In the second volume VOL2, address information TIME in the lead-in area LI2 is allotted as a value which increments continuously from the inner peripheral side of the disk and ends at F9 (159) minute 59 second 74 frame which is the maximum value in case digit of 10 of minute information is expressed in hexadecimal. Absolute address information ATIME in the program area PGM2 and the lead-out area LO2 is allotted as a value which starts from a value which is continuous to a final value of absolute address information ATIME in the lead-out area LO1 in the first volume VOL1, increments continuously from the inner peripheral side of the disk and ends at a desired value.

In the third volume VOL3, address information TIME in the lead-in area LI3 is allotted as a value which increments continuously from the inner peripheral side of the disk so that it ends at a value which continues to the start value of address information TIME in the lead-in area LI2 of the second volume VOL2. Absolute address information ATIME in the program area PGM3 and the lead-out area LO3 is allotted as a value which starts from a value which continues to the final value of absolute address information ATIME in the lead-out area LO2 in the second volume VOL2, increments continuously from the inner peripheral side of the disk and ends within F9 minute 59 seconcd 74 frame.

In each of the volumes can be recorded information which indicates existence of a next volume. Information indicating existence of a next volume can be recorded in, e.g., a main channel of a pregap which is allotted to the head of the program area of each volume. In the standard CD-ROM format, the main channel of the pregap is all "0". By changing a specific one bit or plural bits in the main channel to "1", existence of a next volume can be expressed. For example, in the example of FIG. 14 in which the second and third volumes VOL2 and VOL3 exist, a signal "1" is recorded in a specific bit or bits in the pregap of the first volume VOL1 and a signal "1" is also recorded in a specific bit or bits in the pregap of the second volume VOL2. Since there is no fourth volume in this example, all "0" is recorded in the pregap of the third volume VOL3.

In each of the volumes may be recorded the volume number of the particular volume. This volume number may be recorded throughout the entire volume period by using, e.g., ZERO field of Q-channel subcodes. By providing the reproduction device with the ability to analyze this volume number, the volume number of the currently reproduced volume can be known and this information can be utilized effectively for operations including access operation.

There are various types of CD-ROM data formats. By employing the format of mode-1 or the format of mode 2, form-1 which contains data of EDC (error detection) and ECC (error correction), reproduction of data with a high accuracy can be realized and information indicating existence of a next volume can be detected with a high accuracy.

Figure 14:
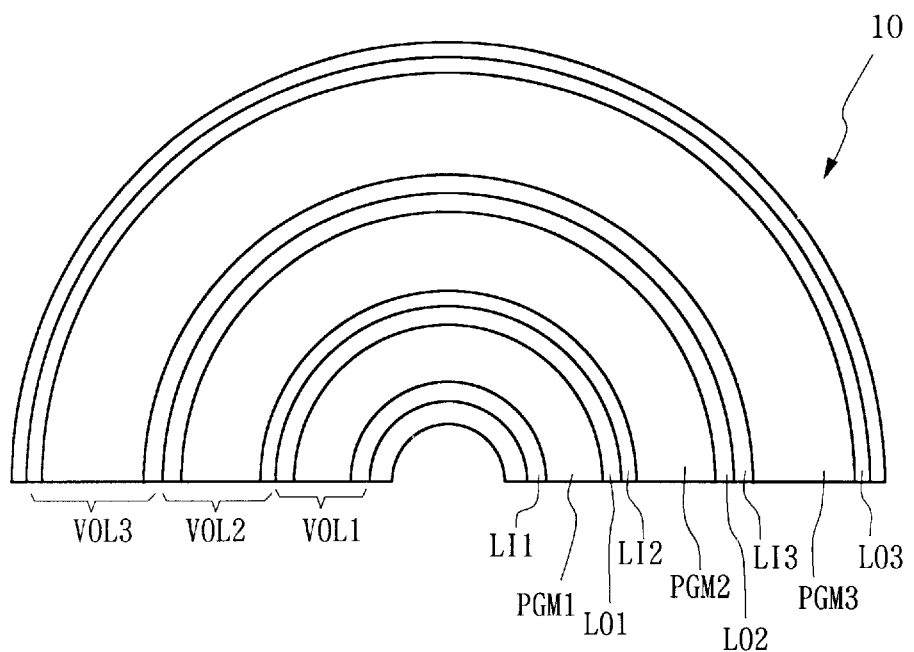
FIG. 14 is a plan view of the optical disk (only a half thereof is shown), showing an example of state of division of the recording surface in volumes.

The optical disk 100 of FIG. 14 can be constructed, e.g., as a CD-ROM containing a game software. In this case, desired information such as video information or audio information may be included in the first volume and separate game softwares may be included in the second and third volumes so that a game machine exclusively provided for this optical disk can reproduce all volumes whereas a standard CD-ROM player cannot detect existence of the second and subsequent volumes or analyze address information in the lead-in area of the second and subsequent volumes but can reproduce only the video information or audio information in the first volume.

Figure 15:
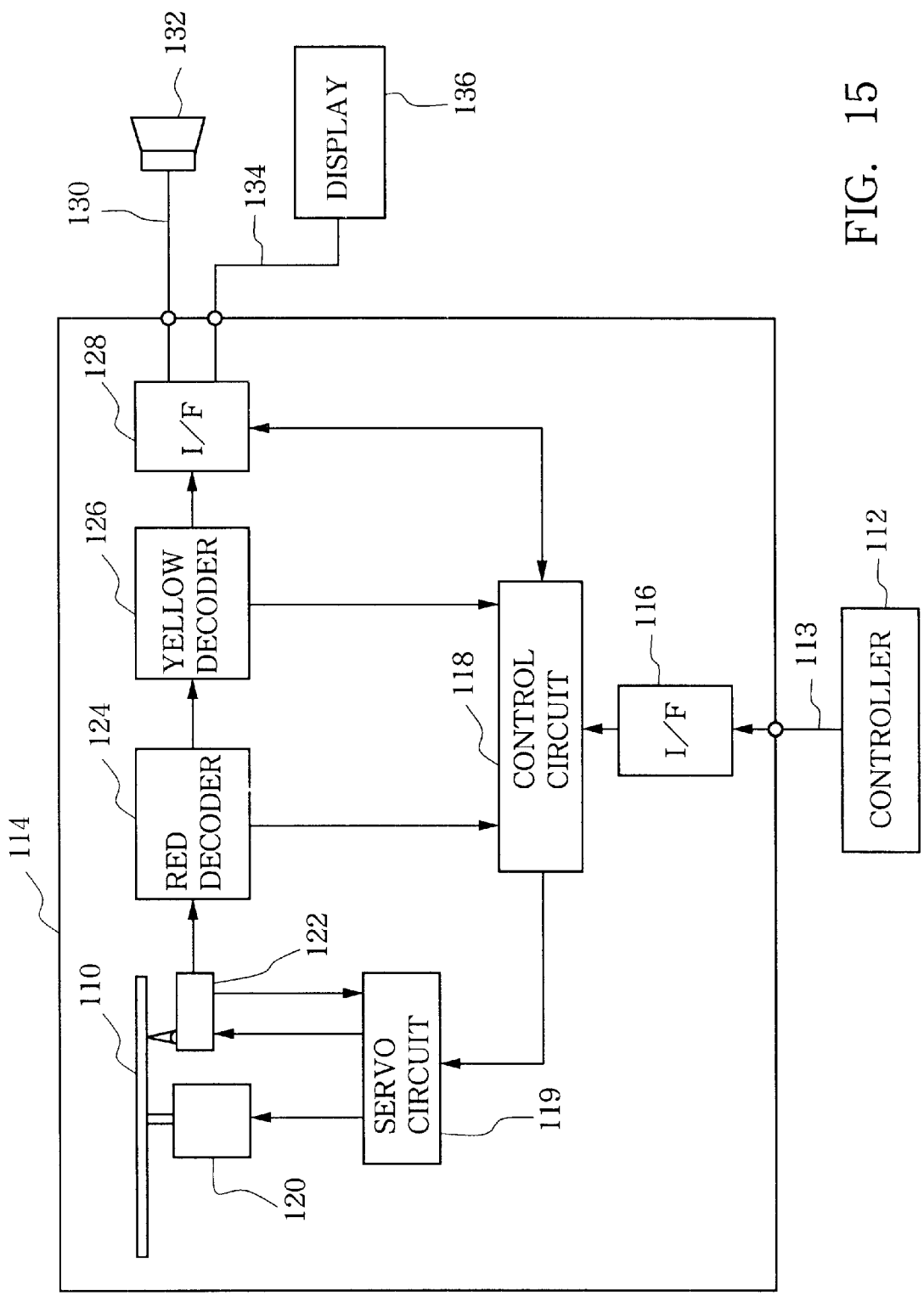
FIG. 15 is a block diagram showing a game machine which is an embodiment of the optical disk reproduction device according to the invention.

FIG. 15 illustrates an example of a game machine used exclusively for the optical disk 100 constructed as a CD-ROM including a game software. A controller 112 provides various operation commands to the game machine 114 through a transmission cable 113 in accordance with an operation by the operator. In the game machine 114, a control circuit 118 receives these operation commands through an interface circuit 116 and, in accordance with these commands, controls a servo circuit 119 which in turn controls a spindle motor 120 and an optical pickup 122 to read information from the optical disk 100.

A signal read by the optical pickup 122 is applied to a Red decoder 124 for signal processing based on the Red Book standard. In this case, digit of 10 of minute information in address information TIME and ATIME of Q-channel subcodes is analyzed as a value expressed in hexadecimal. The decoded signal is applied to a Yellow decoder 126 for CD-ROM signal processing based on the Yellow Book standard. The decoded audio signal and video signal are delivered out through an interface circuit 128. The audio signal is reproduced from a loud-speaker 132 through a transmission cable 130 and the video signal is displayed by a display 136 through a transmission cable 134.

Figure 16:
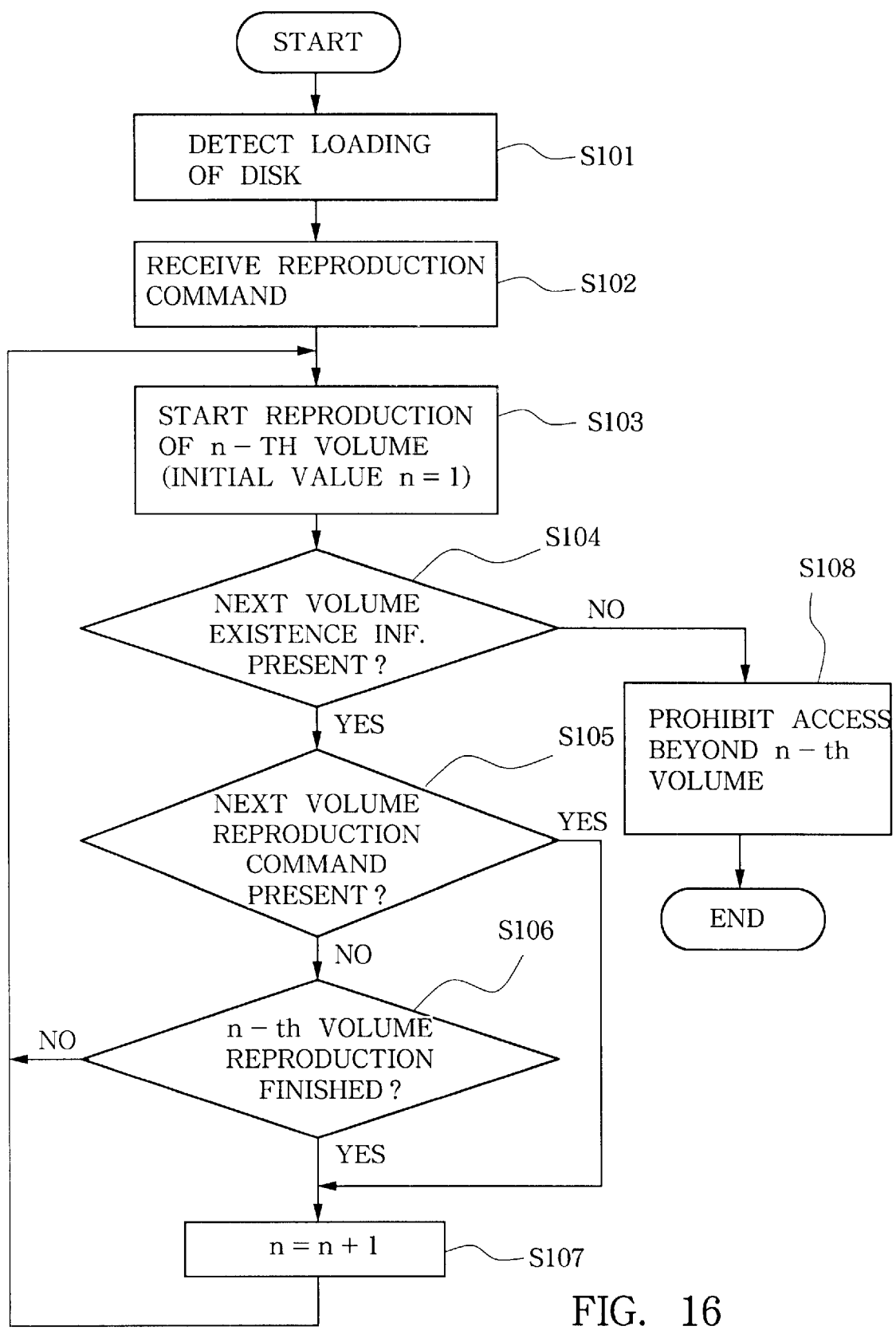
FIG. 16 is a flow chart schematically showing reproduction of the optical disk by the game machine of FIG. 15.

The reproduction operation by the game machine of FIG. 15 is schematically illustrated in FIG. 16. Upon loading of the optical disk 100 in the game machine 114 (S101) and issuance of a reproduction command (S102), the first volume VOL1 is reproduced first (S103). In the reproduction of the first volume VOL1, TOC information of the first volume VOL1 is first read from the lead-in area LI1 and then the program area PGM1 is reproduced. At the beginning of the reproduction of the program area PGM1, existence information indicating existence of the second volume VOL2 is read from the pregap (S104) and then main information, e.g., video information or audio information of the first volume VOL1 is reproduced in response to the TOC information and is reproduced by the display 136 (or dispalyed by the display 136 and reproduced from the loud-speaker 132). While the first volume VOL1 is being reproduced, the volume number of this volume is read from, e.g., ZERO field of Q-channel subcodes so that the reproduction of the first volume VOL1 is analyzed.

When, in the state where the next volume existence information has been obtained (S104) and the first volume VOL1 is being reproduced, a command for reproducing the next volume is received in accordance with an operation of the controller 112 by the operator (S105), or when the reproduction of the first volume VOL1 has been finished (S106), the start position of the second volume VOL2 is accessed and the second volume VOL2 is reproduced (S107, S103). At the beginning of reproduction of the second volume VOL2, TOC information of the second volume is read from the lead-in area LI2 and then the program area PGM2 is reproduced in accordance with the TOC information. Since the start address of the lead-out area of the first volume VOL1 is previously known from TOC information of the first volume VOL1, the start position of the second volume VOL2 can be obtained by calculation by setting the lead-out area LO to a certain length. While the second volume VOL2 is being reproduced, the volume number of this volume is read from, e.g., ZERO field of Q-channel subcodes and the reproduction of the second volume thereby is analyzed.

When, in the state where the next volume existence information has been obtained (S104) and the second volume VOL2 is being reproduced, a command for reproducing the next volume has been received by operation of the controller 112 by the operator (S105) or the reproduction of the second volume VOL2 has been finished (S106), the start position of the third volume VOL3 is accessed and the third volume VOL3 is reproduced (S107, S103). At the beginning of reproduction of the third volume VOL3, TOC information of the third volume is read from the lead-in area LI3 and then the program area PGM3 is reproduced in accordance with the TOC information. Since the start address of the lead-out area of the second volume VOL2 is previously known from TOC information of the second volume VOL2, the start position of the third volume VOL3 can be obtained by calculation by setting the lead-out area LO to a certain length. While the third volume VOL3 is being reproduced, the volume number of this volume is read from, e.g., ZERO field of Q-channel subcodes and the reproduction of the third volume thereby is analyzed. Since no existence information of the fourth volume is available in the pregap of the third volume VOL3 (S104), access beyond the third volume VOL3 is prohibited (S108).

In case the optical disk 100 is reproduced by a standard CD-ROM player, information indicating existence of a next volume cannot be recognized and, therefore, existence of the second and third volumes VOL2 and VOL3 cannot be recognized and address information TIME in the lead-in areas LI2 and LI3 and absolute address information in the program areas PGM2 and PGM3 and the lead-out areas LO2 and LO3 of the second and third volumes VOL2 and VOL3 which are expressed in hexadecimal cannot be analyzed. Therefore, the standard CD-ROM player can only reproduce information in the first volume VOL1 (e.g., video information or audio information) and cannot access the second and third volumes VOL2 and VOL3.

Figure 17:
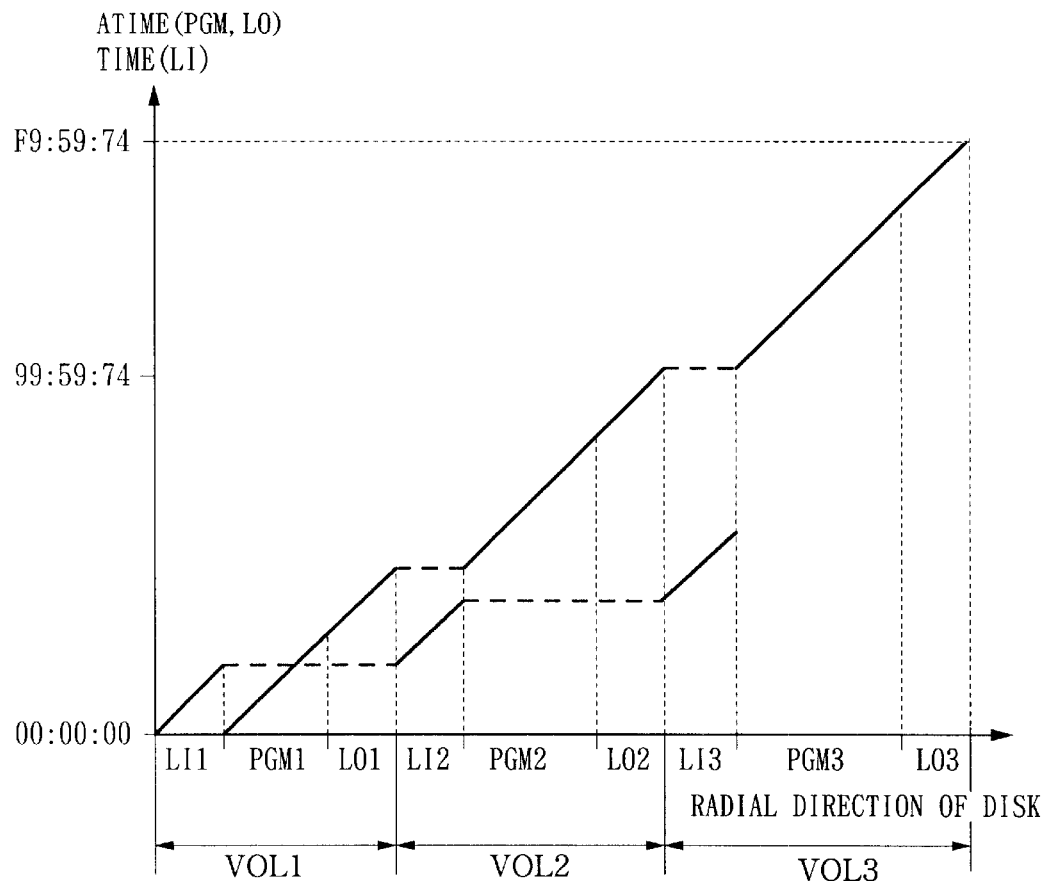
FIG. 17 is a diagram showing another example of address information imparted to respective positions in the radial direction of the optical disk.

Another example of the optical disk achieving the second object of the invention will be described with reference to FIG. 17. In this optical disk, address information TIME recorded in the lead-in area LI of each volume is made of address information which increments continuously from an initial value of 00 minute 00 second 00 frame without overlapping among the respective volumes. Address information TIME of the first volume VOL1 continuously increments starting from 00 minute 00 second 00 frame, address information TIME of the second volume VOL2 continuously increments starting from a value continuous to a final value of address information TIME of the first volume VOL1 and address information TIME of the third volume VOL3 continuously increments starting from a value continuous to a final value of address information of address information TIME of the second volume VOL2. Absolute time information ATIME recorded in the program area PGM and the lead-out area LO of each volume is made of address information which continuously increments from an initial value without overlapping among the respective volumes.

Figure 20:
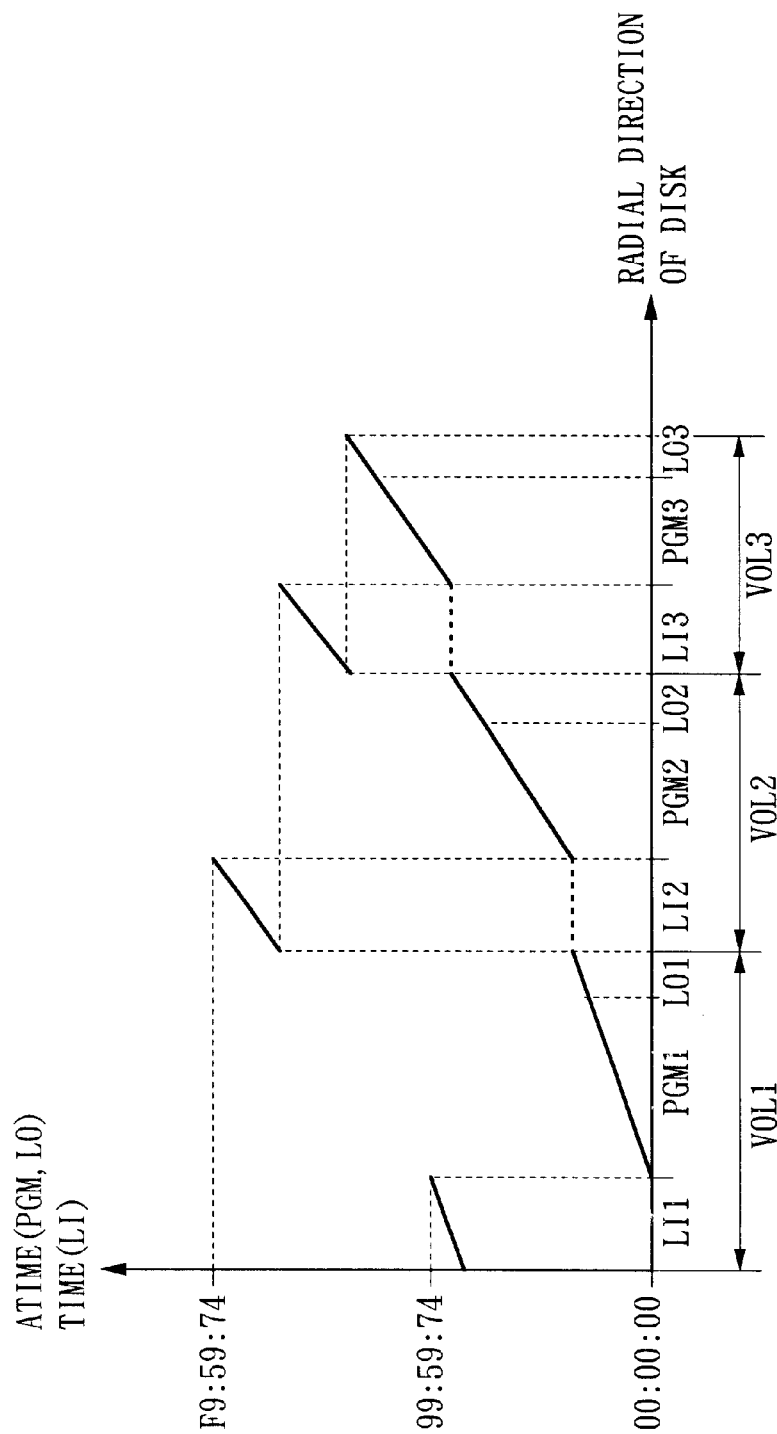
FIG. 20 is a diagram showing another example of address information imparted to respective positions in the radial direction of the optical disk in case the recording surface of the disk is divided in three volumes.

Another embodiment of the optical disk according to the invention which achieves the above described third object of the invention will now be described with reference to FIGS. 18, 19 and 20.

In this embodiment, the optical disk is constructed as a CD-ROM for a game software with its recording surface being divided into two volumes. The first volume contains desired video information (or video information and audio information) and the second volume contains the game software. A reproduction device adapted exclusively to be a game machine can reproduce both the first and second volumes but a standard CD-ROM player cannot recognize existence of the second volume or analyze address information in the lead-in area of the second and subsequent volumes so that the standard CD-ROM player can reproduce only the video information (or video and audio information) in the first volume.

FIG. 19 illustrates the construction of this optical disk 200. The optical disk 200 has a disk diameter of 12 cm which is the same as the currently available CD. The recording surface of the optical disk 200 is divided in the radial direction of the disk into two continuous volumes of VOL1 and VOL2. The recording density of the first volume VOL1 is a standard recording density determined by the current CD format and the recording density of the second volume VOL2 is made higher than the recording density of the current CD format by, e.g., narrowing the track pitch (interval between adjacent tracks).

Each of the volumes VOL1 and VOL2 consists of a lead-in area LI, a program area PGM and a lead-out area LO from the inner peripheral side of the disk and information of each area is recorded in a CD-ROM format. In the lead-in area LI is recorded TOC information of its volume. The first volume VOL1 may contain a utility area.

The format of Q-channel subcodes in the lead-in area of this optical disk 200 is the same as the format of the previously described optical disk 100 of FIG. 14 and the formats of the Q-channel subcodes in the program area and the lead-out area are the same as those of the previously described optical disk 100, so that detailed description of these formats will be omitted.

Figure 18:
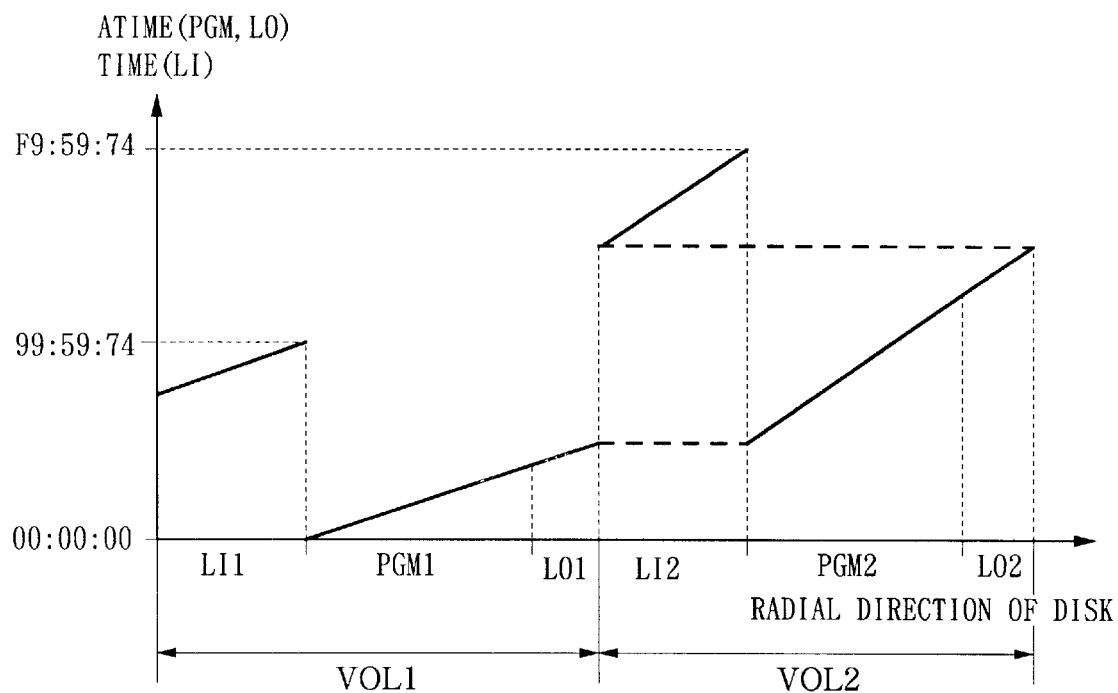
FIG. 18 is a diagram showing an example of address information imparted to respective positions in the radial direction of the optical disk of FIG. 19 which is another embodiment of the invention.

An example of address information (absolute address information ATIME in the program area and the lead-out area and address information TIME in the lead-in area) allotted to respective positions in the radial direction of the optical disk 200 is shown in FIG. 18. In the first volume VOL1 , address information TIME in the lead-in area LI is allotted in such a manner that it continuously increments from the inner peripheral side of the disk so that it ends at 99 minute 59 second 74 frame which is the maximum value in the CD format. Absolute address information ATIME in the program area PGM1 and the lead-out area LO1 in VOL1 is allotted as a value which starts from the initial value of 00 minute 00 second 00 frame and continuously increments from the inner peripheral side of the disk and ends with a value which is smaller than the start address in the lead-in area LI1.

In the second volume VOL2, address information TIME in the lead-in area LI2 is allotted as a value which increments continuously from the inner peripheral side of the disk and ends at F9 (159) minute 59 second 74 frame which is the maximum value in case digit of 10 of minute information is expressed in hexadecimal. Absolute address information ATIME in the program area PGM2 and the lead-out area LO2 is allotted as a value which starts from a value which is continuous to a final value of absolute address information ATIME in the lead-out area LO1 in the first volume VOL1, increments continuously from the inner peripheral side of the disk and ends with a value which is smaller than the start address of the lead-in area LI2.

Information indicating existence of a next volume can be recorded in, e.g., a main channel of a pregap which is allotted to the head of the program area of each volume. In the example of FIG. 18 in which the second volume VOL2 exists, a signal "1" is recorded in a specific bit or bits in the pregap of the first volume VOL1. Since there is no third volume in this example, all "0" is recorded in the pregap of the second volume VOL2.

There are various types of CD-ROM data formats. By employing the format of mode-1 or the format of mode 2, form-1 which contains data of EDC (error detection) and ECC (error correction), reproduction of data with a high accuracy can be realized and information indicating existence of a next volume can be detected with a high accuracy.

For reproducing this optical disk 200, the game machine 114 of FIG. 15 can be used for reproducing all of the volumes of the optical disk 200 constructed as a CD-ROM including a game software. Description of the construction and operation of this game machine will be omitted.

The reproduction operation by this game machine for reproducing the optical disk 200 is the same as the reproduction operation of the optical disk 100 by this game machine which is schematically illustrated in FIG. 16 except that reading of volume number information is not made in the reproduction of the optical disk 200 and that, since no existence information of the third volume is available in the pregap of the second volume VOL2 (S104), access beyond the second volume VOL2 is prohibited (S108).

In case the optical disk 200 is reproduced by a standard CD-ROM player, information indicating existence of a next volume cannot be recognized and, therefore, existence of the second volume VOL2 cannot be recognized and address information TIME in the lead-in area LI2 and absolute address information in the program area PGM2 and the lead-out area LO2 of the second volume VOL2 which is expressed in hexadecimal cannot be analyzed. Therefore, the standard CD-ROM player can only reproduce information in the first volume VOL1 (e.g., video information or audio information) and cannot access the second volume VOL2.

In the above described example, the number of volumes is limited to two. It is also possible to use three or more volumes. FIG. 20 illustrates an example in which the recording surface is divided in three volumes. In this example, information is recorded in the first volume VOL1 with a standard recording density determined by the CD format and recorded in the second and third volumes VOL2 and VOL3 with a recording density which is higher than the standard recording density.

In the first volume VOL1, address information TIME in the lead-in area LI is allotted in such a manner that it continuously increments from the inner peripheral side of the disk so that it ends at 99 minute 59 second 74 frame which is the maximum value in the CD format. Absolute address information ATIME in the program area PGM1 and the lead-out area LO1 in VOL1 is allotted as a value which starts from the initial value of 00 minute 00 second 00 frame and continuously increments from the inner peripheral side of the disk and ends with a value which is smaller than the start address of the lead-in area LI1.

In the second volume VOL2, address information TIME in the lead-in area LI2 is allotted as a value which increments continuously from the inner peripheral side of the disk and ends at F9 (159) minute 59 second 74 frame which is the maximum value in case digit of 10 of minute information is expressed in hexadecimal. Absolute address information ATIME in the program area PGM2 and the lead-out area LO2 is allotted as a value which starts from a value which is continuous to a final value of absolute address information ATIME in the lead-out area LO1 in the first volume VOL1, increments continuously from the inner peripheral side of the disk.

In the third volume VOL3, address information TIME in the lead-in area LI3 is allotted as a value which increments continuously from the inner peripheral side of the disk so that it ends at a value which continues to the start value of address information TIME in the lead-in area LI2 of the second volume VOL2. Absolute address information ATIME in the program area PGM3 and the lead-out area LO3 is allotted as a value which starts from a value which continues to the final value of absolute address information ATIME in the lead-out area LO2 in the second volume VOL2, increments continuously from the inner peripheral side of the disk and ends with a value which is smaller than the start address in the lead-in area LI3.

In the above described examples of FIGS. 13 to 20, the information indicating existence of a next volume is recorded in the pregap of the program area. This information may alternatively be recorded in the lead-out area or recorded as data within or outside of a control range of the file system of the program area, or may be recorded in an empty area of Q-channel subcodes in the lead-in area. Alternatively, instead of recording information indicating existence of a next volume, a control may be made in the reproduction device so that the reproduction device spontaneously accesses an area on the outer peripheral side of the disk from the current volume and, when it has found a lead-in area, it accesses this volume. Alternatively further, the optical disk reproduciton device may be combined with the host computer so that information read by the optical disk reproduction device is transmitted to the host computer which analyzes the information and supplies a command for accessing each volume to the optical disk reproduction device to reproduce each volume. The number of division of volumes is not limited to two or three but the recording surface may be divided into four or more volumes.

What is claimed is:

1. An optical disk having a recording surface which is divided in a radial direction of the optical disk into a plurality of volumes each comprising a combination of a lead-in area, a program area and a lead-out area, the lead-in area, the program area and the lead-out area of the respective volumes having Compact Disc format information and volume identification information, the Compact Disc format information representing information of Compact Disc format therein, the volume identification information representing information for identifying the volume of the lead-in area, the program area and the lead-out area, each of the volume identification information being recorded in ZERO field of Q-channel subcodes of the lead-in area, the program area and the lead-out area of the respective volumes.

2. An optical disk as defined in claim 1 wherein each of said volumes is adapted to have absolute address information recorded therein, at least a part of said absolute address information overlapping among said volumes.

3. An optical disk as defined in claim 1 wherein each of said volumes is adapted to have absolute address information recorded therein, said absolute address information starting from a common initial value.

4. An optical disc as defined in claim 1 wherein final volume identification information, indicating that a particular volume is an outermost volume, is recorded, instead of the volume identification information or in addition to the volume identification information, in a predetermined position of the outermost volume among the plurality of volumes.

5. An optical disk recording device for recording information on the optical disk as defined in claim 1.

6. An optical disk as defined in claim 3 wherein at least two of said volumes have different storage capacity from each other and said absolute address information is time information starting from a common initial value.

7. An optical disk as defined in claim 6 which has total recording time of 100 minutes or more by recording said information with a recording density which is higher than a standard recording density determined by the Compact Disc format.

8. An optical disk as defined in claim 6 which has total recording time of 100 minutes or more by using a disk having a disk diameter exceeding 12 cm.

9. An optical disk as defined in claim 6 wherein said volume identification information starts from 0.

10. An optical disk as defined in claim 6 wherein said volume identification information starts from 1.

11. An optical disc as defined in claim 6 wherein final volume identification information, indicating that a particular volume is an outermost volume, is recorded, instead of the volume number information or in addition to the volume number information, in a predetermined position of at least the lead-in area of the outermost volume among the plurality of volumes.

12. An optical disk as defined in claim 6 wherein recording capacity of each of said volumes is less than 100 minutes.

13. An optical disk as defined in claim 6 which includes a volume having recording capacity of 100 minutes or more and a digit of 10 of minute information in said absolute address information is expressed in hexadecimal.

14. An optical disk having a recording surface, comprising:
   a plurality of volumes into which the recording surface is divided in a radial direction of the optical disk, each of the plurality of volumes comprising a lead-in area, a program area and a lead-out area, each of the lead-in area, the program area and the lead-out area having Compact Disc format information representative of Compact Disc format,
   wherein the outermost volume among the plurality of volumes has final volume identification information that indicates that the volume is the outermost volume among the plurality of volumes; and
   wherein the final volume identification information is recorded in Q-channel subcodes of at least one of the lead-in area, the program area and the lead-out area of the outermost volume.

15. An optical disk reproduction device for reproducing information from an optical disk having a recording surface which is divided in a radial direction of the optical disk into a plurality of volumes each comprising a combination of a lead-in area, a program area and a lead-out area, the lead-in area, the program area and the lead-out area of the respective volumes being adapted to have information of Compact Disc format recorded therein, and adapted to have volume identification information, for identifying the volume of said area, recorded in a predetermined position of said area, said optical disk reproducing device comprising:
   a volume number designation section for designating a volume number;
   an absolute time designation section for designating absolute time in a volume or information corresponding to the absolute time;
   a position information extracting circuit for extracting the volume identification information and absolute address information from among information read from the optical disk; and
   a control circuit for controlling a reproduction position of an optical pickup so that the extracted volume identification information will become a value which corresponds to the designated volume number and the extracted absolute address information will become a value which corresponds to the designated absolute time.

16. An optical disk reproduction device as defined in claim 15 further including a circuit for analyzing a digit of 10 of minute information in address information read from the optical disk as hexadecimal, wherein information is recorded in the Compact Disc format.

17. An optical disk having a recording surface on which information prepared in accordance with a Compact Disc format is recorded and which is divided in a radial direction of the optical disk into a plurality of volumes each comprising a combination of a lead-in area, a program area and a lead-out area, the program area and the lead-out area of the respective volumes recording first address information being comprised of absolute address information which does not overlap among the respective volumes, and the lead-in area of the respective volumes recording second address information being comprised of address information which is distinguishable from the absolute address information recorded in the program area and the lead-out area, wherein the second address information recorded in the lead-in area of each of said volumes is distinguishable from the first address information recorded in the program area and the lead-out area by identifying track number information recorded in Q-channel subcodes in the respective volumes in accordance with the Compact Disc format.

18. An optical disk as defined in claim 17 wherein a part or all of said volumes have a higher recording density than a standard recording density determined by the Compact Disc format, and the first address information recorded in the program area and the lead-out area of each of said volumes is comprised of address information which continuously increments from an initial value without overlapping among the respective volumes.

19. An optical disk as defined in claim 17 wherein a digit of 10 of minute information in the first address information recorded in the program area and the lead-out area is formed in hexidecimal.

20. An optical disk as defined in claim 18 wherein a digit of 10 of minute information in the first address information recorded in the program area and the lead-out information is formed in hexidecimal.

21. An optical disk as defined in claim 18 wherein the second address information recorded in the lead-in area of each of said volumes is comprised of address information which does not overlap among the respective volumes and in which the second address information recorded in the lead-in area and the first address information recorded in the program area and the lead-out area overlap with each other at least partially.

22. An optical disk as defined in claim 18 wherein the second address information recorded in the lead-in area of the respective volumes is comprised of address information which increments continuously from an initial value without overlapping among the respective volumes.

23. An optical disc as defined in claim 18 wherein the second address information recorded in the lead-in area of a first volume and the first address information recorded in the program area and the lead-out area of the first volume are both comprised of address information within a range determined by the Compact Disc format.

24. An optical disk having a recording surface on which information prepared in accordance with a Compact Disc format is recorded and which is divided in a radial direction of the optical disk into a plurality of volumes each comprising a combination of a lead-in area, a program area and a lead-out area, absolute address information recorded in the program area and the lead-out area of each of said volumes being comprised of address information which does not overlap among the respective volumes, address information recorded in the lead-in area of each of said volumes being comprised of address information which is distinguishable from the absolute address information recorded in the program area and the lead-out area, a part or all of said volumes having a higher recording density than a standard recording density determined by the Compact Disc format, the absolute address information recorded in the program area and the lead-out area of each of said volumes being comprised of address information which continuously increments from an initial value without overlapping among the respective volumes, wherein address information recorded in the lead-in area of an innermost first volume is comprised of address information within a range determined by the Compact Disc format and address information recorded in the lead-in area of a second volume is comprised of address information which increments from the inner peripheral side of the disk and in which a digit of 10 of minute information is formed in hexadecimal and a final value ends with F9 minute, 59 second, 74 frame.

25. An optical disk as defined in claim 24 wherein address information recorded in the lead-in area of an n-th volume (n being 3 or a larger whole number) is comprised of address information which increments from the inner peripheral side of the disk and in which a final value is continuous to a start address of address information in the lead-in area of an n-1-th volume.

26. An optical disk having a recording surface, comprising:
 a plurality of volumes into which the recording surface is divided in a radial direction of the optical disk, each of the plurality of volumes comprising a lead-in area, a program area and a lead-out area,
 wherein the program area and the lead-out area of the respective volumes record first address information;
 wherein the lead-in area of the respective volumes records second address information;
 wherein the first address information and the second address information recorded in one of said volumes have a value which is less than 100 minute 00 second 00 frame; and
 wherein the second address information recorded in volumes other than the one of said volumes has a value which is larger than 99 minute 59 second 74 frame.

27. An optical disk having a recording surface on which information prepared in accordance with a Compact Disc format is recorded and which is divided in a radial direction of the optical disk into a plurality of volumes each comprising a combination of a lead-in area, a program area and a lead-out area, the program area and the lead-out area of the respective volumes recording first address information, the lead-in area of the respective volumes recording second address information, the first address information and the second address information recorded in one of said volumes being comprised of address information within a range determined by the Compact Disc format, the second address information recorded in volumes other than the one of said volumes being comprised of address information having a value which is greater than the range determined by the Compact Disc Format, wherein information is recorded in an innermost first volume with a standard recording density determined by the Compact Disc format and information is recorded in a second and subsequent volumes on an outer peripheral side of the optical disc with a recording density which is higher than the standard recording density determined by the Compact Disc format, the second address information recorded in the lead-in area of the first volume and the first address information recorded in the program area and the lead-out area of the first volume being comprised of the address information within the range determined by the Compact Disc format and the second address information recorded in the lead-in area of the second and subsequent volumes being comprised of the address information which is larger than the value determined by the Compact Disc format.

28. An optical disk reproduction device for reproducing an optical disk having a recording surface on which information prepared in accordance with a Compact Disc format is recorded and which is divided in a radial direction of the optical disk into a plurality of volumes each comprising a combination of a lead-in area, a program area and a lead-out area, the program area and the lead-out area of the respective volumes recording first address information, the lead-in area of the respective volumes recording second address information, the first address information and the second address information recorded in one of said volumes being comprised of address information within a range determined by the Compact Disc format, the second address information recorded in volumes other than the one of said volumes being comprised of address information having a value which is greater than the range determined by the Compact Disc format, said reproduction device comprising a circuit for analyzing address information within a range determined by the Compact Disc format and address information of a larger value than the value determined by the Compact Disc format.

29. An optical disk as defined in claim 27 wherein a digit of 10 minute information in the second address information recorded in the lead-in area of the second and subsequent volumes is expressed in hexadecimal.

30. An optical disc as defined in claim 27 wherein the first address information recorded in the program area and the lead-out area of each of said volumes is comprised of address information which increments continuously from an initial value without overlapping among the respective volumes.

31. An optical disk as defined in claim 27 wherein information indicating existence of a next volume is recorded in each of said volumes.

32. An optical disk reproduction device for reproducing an optical disk as defined in claim 27 including a circuit for analyzing address information within a range determined by the Compact Disc format and address information of a larger value than the value determined by the Compact Disc format.

33. An optical disk reproduction device as defined in claim 28 including a control circuit which reads, during reproduction of each of said volumes, information indicating existence of a next volume and, when the information indicating existence of the next volume is available, allows access to the next volume whereas, when the information indicating the next volume is not available, prohibits access beyond the current volume.

34. An optical disk as defined in claim 29 wherein the second address information is comprised of 100 minutes or more.

35. An optical disk reproduction device as defined in claim 32 including a control circuit for accessing an area on the outer peripheral side of the lead-out area of a currently reproduced volume to confirm existence of a next volume.

36. An optical disk reproduction device for reproducing an optical disk having a recording surface on which information prepared in accordance with a Compact Disc format is recorded and which is divided in a radial direction of the optical disk into a plurality of volumes each comprising a combination of a lead-in area, a program area and a lead-out area, address information recorded in the lead-in area of a part of said volumes and absolute address information recorded in the program area and the lead-out area of the respective volumes being comprised of address information within a range determined by the Compact Disc format and address information recorded in the lead-in area of volume other than the part of said volumes being comprised of address information which is larger than a value determined by the Compact Disc format, said optical disk reproduction device including a circuit which analyzes address information within a range determined by the Compact Disc format and address information of a larger value than the value determined by the Compact Disc format and a control circuit which reads, during reproduction of each of said volumes, the information indicating existence of a next volume and, when the information indicating existence of the next volume is available, allows access to the next volume whereas, when the information indicating the next volume is not available, prohibits access beyond the current volume.

* * * * *